(12) United States Patent
Mima et al.

(10) Patent No.: US 11,410,338 B2
(45) Date of Patent: Aug. 9, 2022

(54) MEASURING DEVICE AND MEASURING SYSTEM

(71) Applicant: Ricoh Company, Ltd., Tokyo (JP)

(72) Inventors: Hiroki Mima, Kanagawa (JP); Seiya Amano, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 312 days.

(21) Appl. No.: 16/860,238

(22) Filed: Apr. 28, 2020

(65) Prior Publication Data
US 2020/0372683 A1    Nov. 26, 2020

(30) Foreign Application Priority Data

May 20, 2019 (JP) .............................. JP2019-094761

(51) Int. Cl.
*G06T 7/00* (2017.01)
*G01C 3/14* (2006.01)

(52) U.S. Cl.
CPC .................. *G06T 7/97* (2017.01); *G01C 3/14* (2013.01); *G06T 2207/10012* (2013.01)

(58) Field of Classification Search
CPC .... G06T 7/97; G06T 2207/10012; G01C 3/14
See application file for complete search history.

(56) References Cited

U.S. PATENT DOCUMENTS

| | | | |
|---|---|---|---|
| 8,385,630 B2 * | 2/2013 | Sizintsev | G06T 7/97 348/42 |
| 9,128,367 B2 * | 9/2015 | Yamashita | G03B 21/58 |

(Continued)

FOREIGN PATENT DOCUMENTS

| | | |
|---|---|---|
| JP | 11-325890 A | 11/1999 |
| JP | 2004-132870 | 4/2004 |
| JP | 2014-174088 | 9/2014 |

OTHER PUBLICATIONS

Extended European Search Report dated Oct. 27, 2020 in European Patent Application No. 20170803.9, 7 pages.

(Continued)

*Primary Examiner* — Brian P Yenke
(74) *Attorney, Agent, or Firm* — Xsensus LLP

(57) ABSTRACT

A measuring device and a measuring system. The measuring device includes circuitry to obtain at least one pair of stereo captured images captured by a stereo camera, detect two or more feature points from each one of the at least one pair of stereo captured images, and measure a disparity error using a distance between a pair of feature points of the two or more feature points on each one of the at least one pair of stereo captured images, where an equation $$S_{img} > \frac{\Delta S}{E_{da}} d$$

is satisfied. In the equation, $S_{img}$ denotes the distance, $\Delta$ denotes a detection error between the pair of imaging devices. Moreover, $E_{da}$ denotes precision of measurement of a disparity error in disparity between a pair of images of the at least one pair of stereo captured images, and d denotes the disparity. The stereo camera including a pair of imaging devices.

14 Claims, 14 Drawing Sheets

(56) References Cited

U.S. PATENT DOCUMENTS

| | | | |
|---|---|---|---|
| 9,299,153 B2* | 3/2016 | Aoki | G01C 3/14 |
| 9,674,504 B1* | 6/2017 | Salvagnini | G01S 17/894 |
| 9,706,188 B2* | 7/2017 | Yu | H04N 13/246 |
| 9,792,709 B1* | 10/2017 | Meler | H04N 5/23238 |
| 9,807,367 B2* | 10/2017 | Jan | G06T 7/80 |
| 9,807,371 B2* | 10/2017 | Salvagnini | G06T 7/85 |
| 10,546,383 B2* | 1/2020 | Amano | G06V 40/161 |
| 11,108,992 B2* | 8/2021 | Tsunashima | H04N 13/204 |
| 2005/0237385 A1 | 10/2005 | Kosaka et al. | |
| 2012/0194652 A1* | 8/2012 | Myokan | G06T 7/85 |
| | | | 348/E13.074 |
| 2013/0016186 A1* | 1/2013 | Atanassov | G06T 7/85 |
| | | | 348/47 |
| 2014/0161306 A1* | 6/2014 | Ma | G06T 5/006 |
| | | | 382/103 |
| 2014/0176539 A1* | 6/2014 | Tsubaki | G06T 15/00 |
| | | | 345/419 |
| 2015/0358610 A1* | 12/2015 | Takahashi | H04N 13/239 |
| | | | 348/47 |
| 2016/0100198 A1* | 4/2016 | Matsui | H04N 19/597 |
| | | | 382/236 |
| 2016/0266359 A1 | 9/2016 | Amano et al. | |
| 2016/0295108 A1* | 10/2016 | Cao | H04N 5/23238 |
| 2017/0064286 A1* | 3/2017 | Ishimaru | G01C 3/14 |
| 2018/0108150 A1 | 4/2018 | Curtis | |
| 2018/0276835 A1 | 9/2018 | Amano et al. | |
| 2018/0276837 A1 | 9/2018 | Amano et al. | |
| 2018/0285661 A1 | 10/2018 | Amano et al. | |
| 2018/0316907 A1* | 11/2018 | Azuma | H04N 13/239 |
| 2018/0330481 A1 | 11/2018 | Watanabe et al. | |
| 2018/0336701 A1 | 11/2018 | Yokota et al. | |
| 2018/0357783 A1 | 12/2018 | Takahashi et al. | |
| 2019/0003822 A1 | 1/2019 | Takahashi et al. | |
| 2019/0012798 A1 | 1/2019 | Amano et al. | |
| 2019/0391244 A1 | 12/2019 | Sekiguchi et al. | |
| 2020/0074212 A1 | 3/2020 | Amano et al. | |
| 2021/0058598 A1* | 2/2021 | Sadasue | G01B 11/245 |
| 2021/0065404 A1* | 3/2021 | Hayasaka | G06T 7/60 |

OTHER PUBLICATIONS

Fumito Yamano, et al., "Improving the accuracy of a fisheye stereo camera with a disparity offset map," IEEE 2018 12$^{th}$ France-Japan and 10th Europe-Asia Congress on Mechatronics, XP033420748, 2018, pp. 94-97.

* cited by examiner

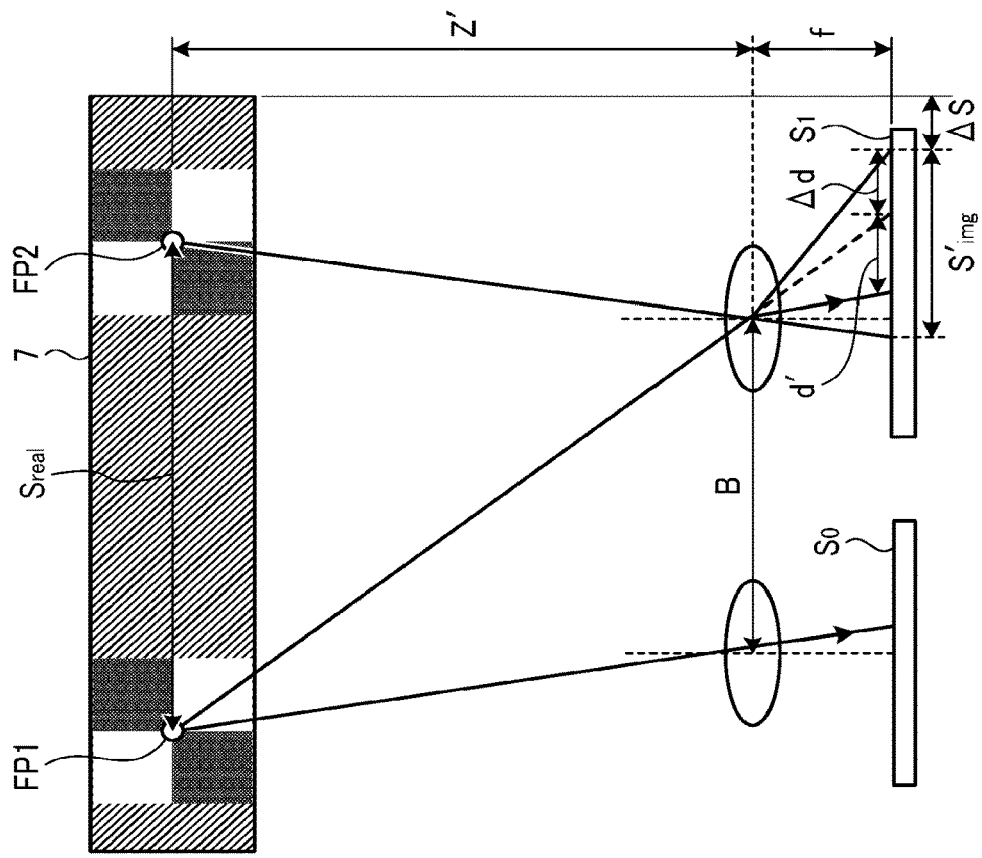
FIG. 5A  BEFORE OPTICAL AXIS IS DISPLACED
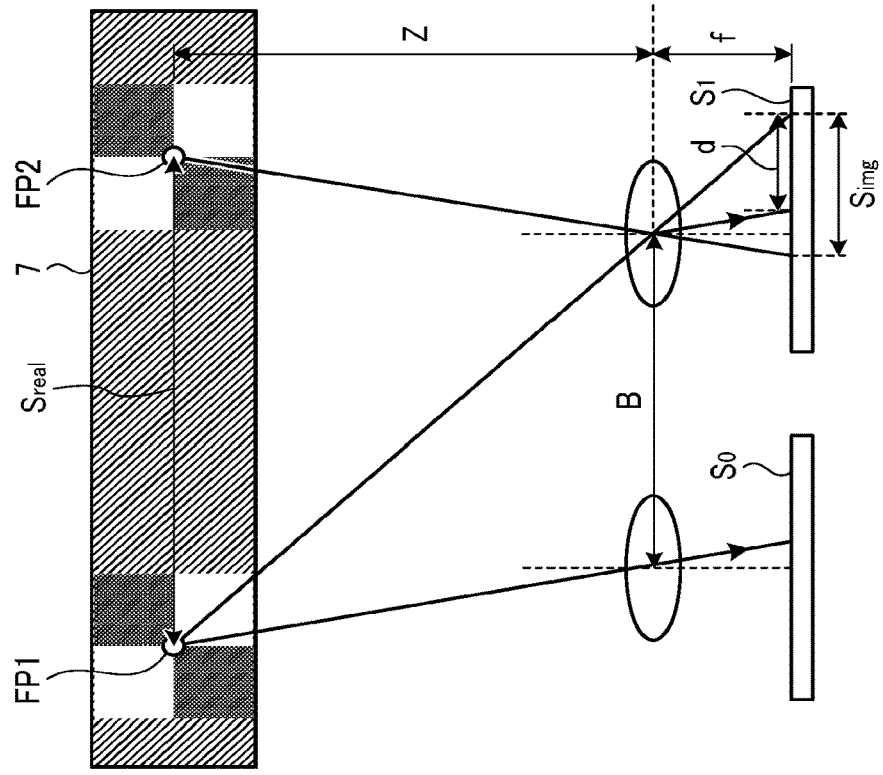
FIG. 5B  AFTER OPTICAL AXIS IS DISPLACED

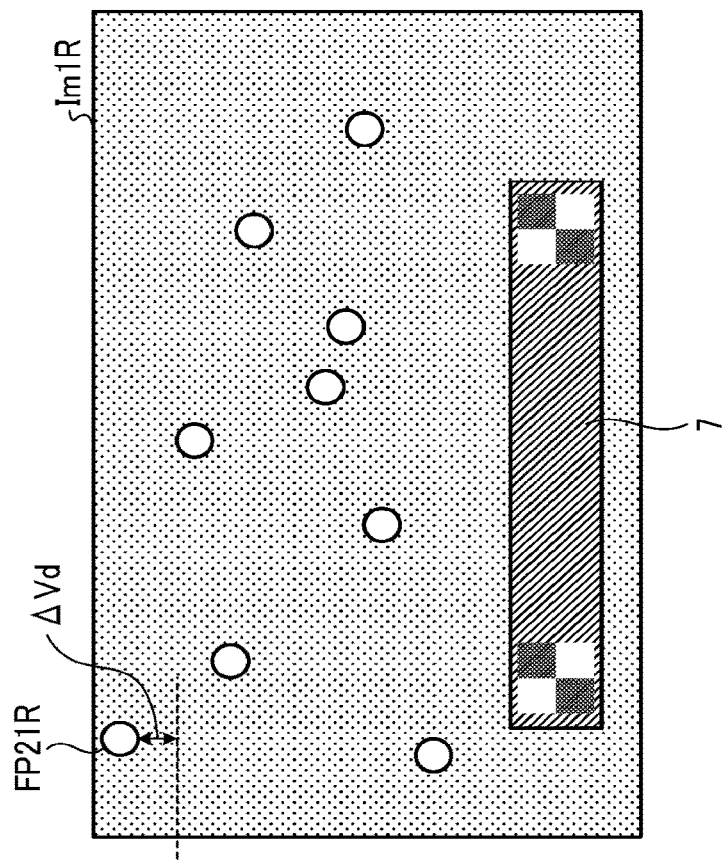
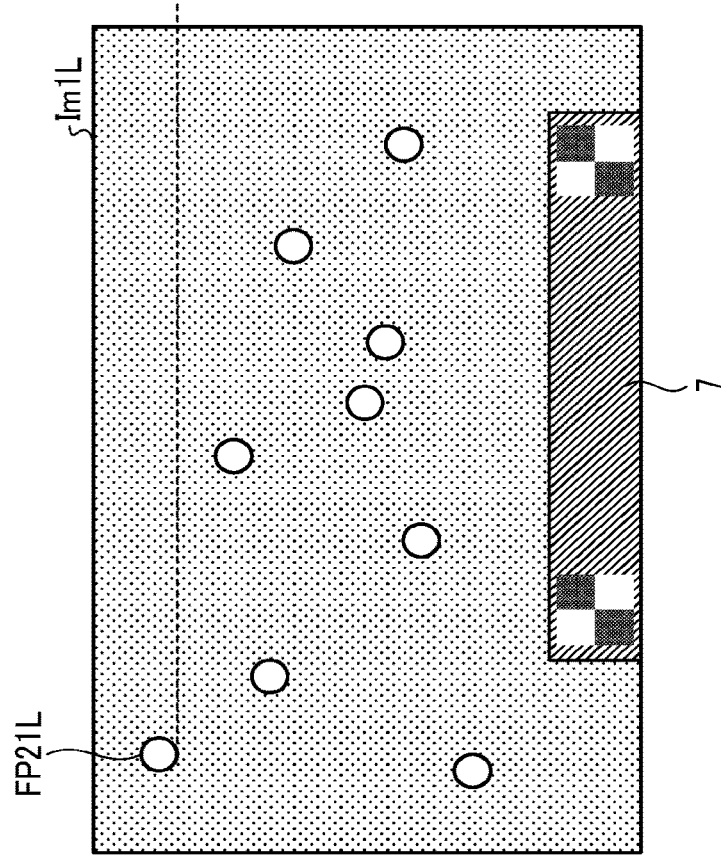

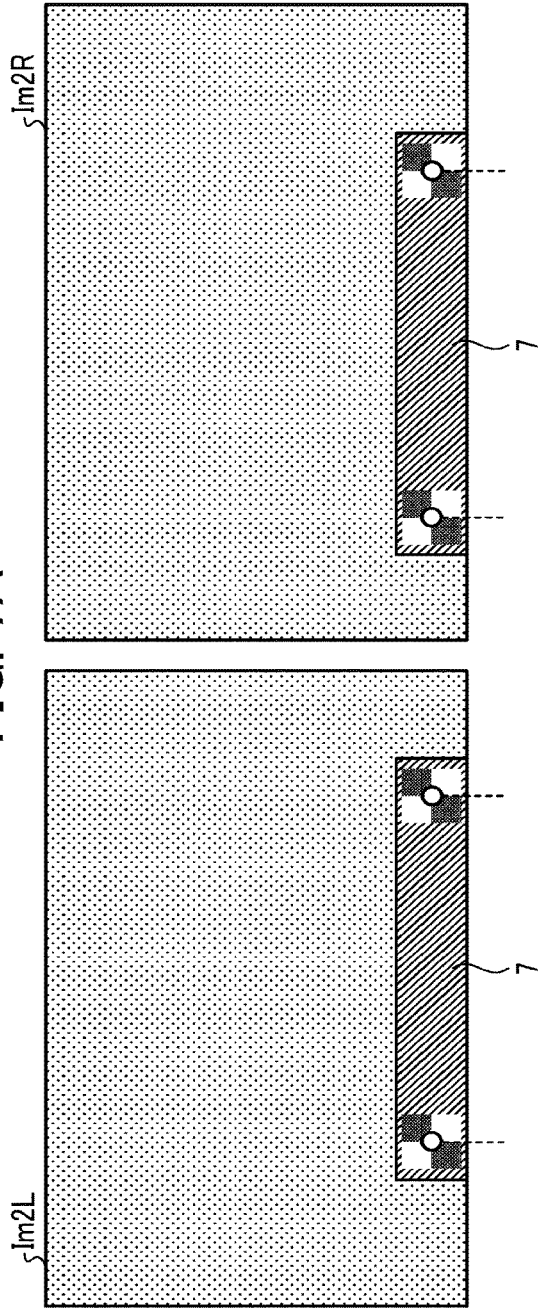
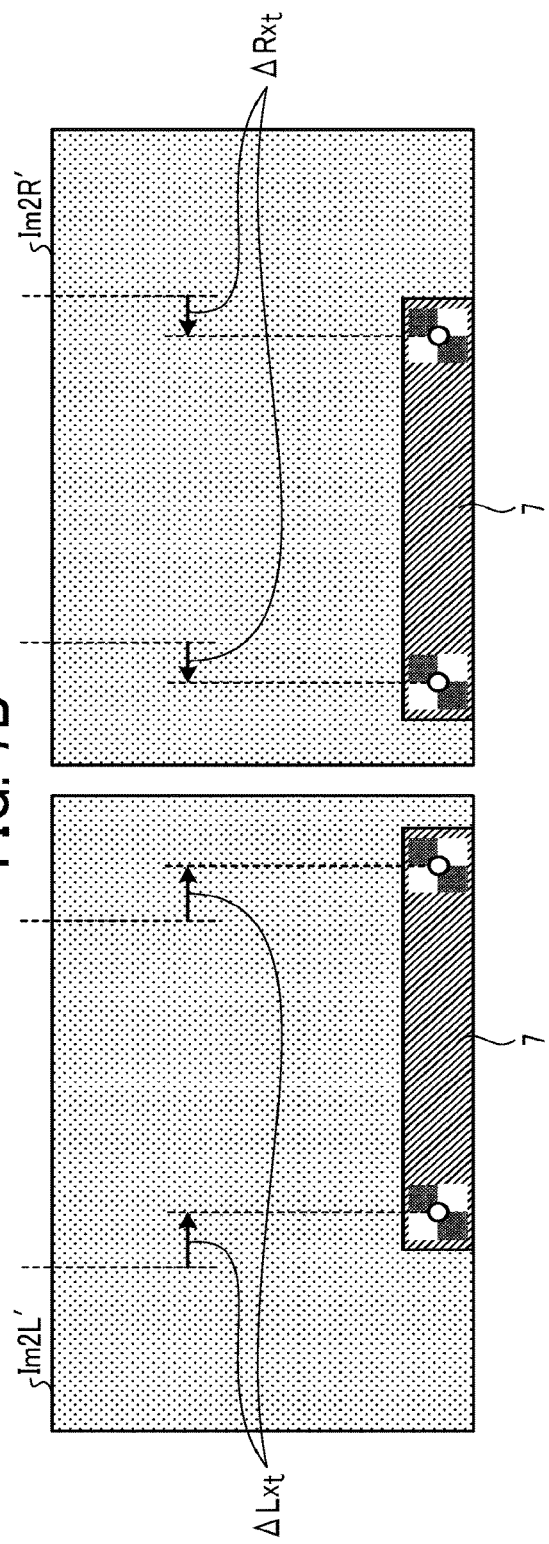

MEASURING DEVICE AND MEASURING SYSTEM

CROSS-REFERENCE TO RELATED APPLICATION

This patent application is based on and claims priority pursuant to 35 U.S.C. § 119(a) to Japanese Patent Application No. 2019-094761, filed on May 20, 2019, in the Japan Patent Office, the entire disclosure of which is hereby incorporated by reference herein.

BACKGROUND

Technical Field

Embodiments of the present disclosure relate to a measuring device and a measuring system.

Background Art

Currently, attention is focused on three-dimensional measurement performed using a pair of stereo cameras. In such a pair of stereo cameras, the pixel block that correlates with a pixel block in the image captured by one of the pair of stereo cameras is specified in the image captured by the other one of the pair of stereo cameras, and the distance information is obtained by performing computation based on the disparity that indicates the amount of relative displacement between the above pair of images. Such computation is performed based on the principles of triangulation. For example, such a pair of stereo cameras are used for the safety management on the road. For example, a pair of stereo cameras are used to perform inspection on the road surface in regard to the bumps and dips (irregularities) of the road surface, the degree of how planar the road surface is, or whether or not a white line disappears on the road surface. In order to obtain the distance information with a high degree of precision using such a pair of stereo cameras, it is desired that no positional displacement exist between a pair of images (stereo images) in addition to a disparity.

Some methods of adjusting such a positional displacement are known in the art, and an adjusting device that reduces the positional displacement is used in such methods.

As such technologies to adjust a positional displacement on a pair of stereo images captured by a pair of stereo cameras, technologies are known in the art in which a pair images of an object whose distance is known are captured using a pair of stereo cameras in order to examine the positional displacement of the stereo cameras and a correction parameter is calculated according to the amount of displacement between corresponding pair of coordinates between the pair of images. Due to such technologies, the direction of the base line of a pair of cameras can be matched with the horizontal direction.

SUMMARY

Embodiments of the present disclosure described herein provide a measuring device and a measuring system. The measuring device includes circuitry to obtain at least one pair of stereo captured images captured by a stereo camera, detect two or more feature points from each one of the at least one pair of stereo captured images, and measure a disparity error using a distance between a pair of feature points of the two or more feature points on each one of the at least one pair of stereo captured images, where an equation $$S_{img} > \frac{\Delta S}{E_{da}} d$$

is satisfied. In the equation, $S_{img}$ denotes the distance, $\Delta S$ denotes a detection error between the pair of imaging devices. Moreover, $E_{da}$ denotes precision of measurement of a disparity error in disparity between a pair of images of the at least one pair of stereo captured images, and d denotes the disparity. The stereo camera includes a pair of imaging devices. The measuring system includes the measuring device.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 5A and FIG. 5B are diagrams each illustrating various kinds of errors caused by the optical-axis displacement, according to embodiments of the present disclosure.

FIG. 6A and FIG. 6B are diagrams each illustrating a method of calculating the amount of vertical displacement, according to embodiments of the present disclosure.

FIG. 7A and FIG. 7B are diagrams each illustrating a disparity error caused by the displacements in optical axis, according to embodiments of the present disclosure.

Figure 1:
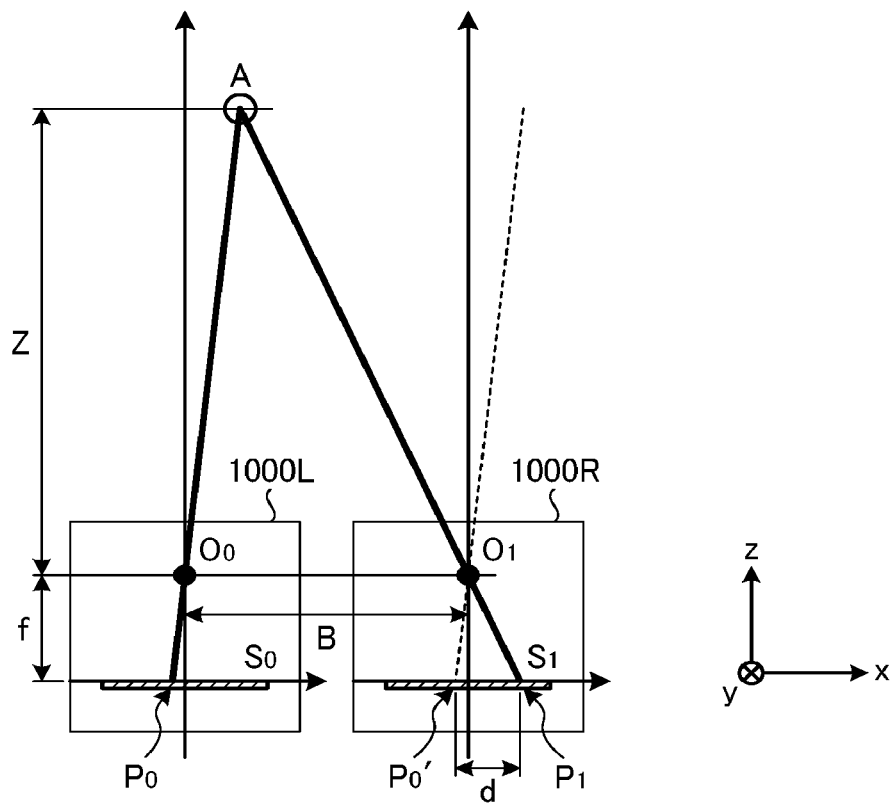
FIG. 1 is a schematic diagram of the principle of distance measurement of how a pair of stereo cameras measure the distance, according to embodiments of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific integrated circuits (ASICs), field-programmable gate arrays (FPGAs), computers or the like. These terms may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

A measuring device and a measuring system according to embodiments of the present disclosure are described below in detail with reference to the drawings. Numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

FIG. 1 is a schematic diagram of the principle of distance measurement of how a stereo camera 6 measures the distance, according to the present embodiment.

Before embodiments of the present disclosure are described, the principle of distance measurement of how the stereo camera 6 measures the distance is described below with reference to FIG. 1.

As illustrated in FIG. 1, a pair of cameras 1000L and 1000R of the stereo camera 6 are arranged such that their optical-axis directions are parallel with the Z-axis direction. "f" and "$O_0$" denote the focal length and optical center of the camera 1000L, respectively, and $S_0$ denotes the imaging area of an imaging device. In a similar manner, "f" and "$O_1$" denote the focal length and optical center of the camera 1000R, respectively, and $S_1$ denotes the imaging area of an imaging device. The camera 1000L and the camera 1000R are arranged such that their respective optical centers $O_0$ and $O_1$ are apart from each other by distance B (base-line length) and the straight line connecting those optical centers becomes parallel to the X-axis.

The image of a subject A that is at a position away from the optical center $O_0$ of the camera 1000L by distance Z in optical-axis direction is formed at a position $P_0$ that is a point of intersection of the straight line A-$O_0$ and the capturing plane $S_0$. On the other hand, in the camera 1000R, the image of the same subject A is formed at a position $P_1$ that is a point of intersection of the straight line A-$O_1$ and the capturing plane $S_1$.

In FIG. 1, a position $P_0'$ indicates a point of intersection of the capturing plane $S_1$ and a straight line that passes through the optical center $O_1$ of the camera 1000R and is parallel with the straight line A-$O_0$, and d indicates the distance between the position $P_0'$ and the point $P_1$. In FIG. 1, the distance d indicates the amount of positional displacement (disparity) on the images of the same subject captured by a pair of cameras.

Further, a triangle A-$O_0$-$O_1$ is similar to a triangle $O_1$-$P_0'$-$P_1$ in shape. Accordingly, the following equation holds true.

$$d = B \times f / Z$$

Thus, the distance Z to the subject A can be calculated according to the base-line length B, the focal length f, and the disparity d.

However, if displacements in optical axis occur in the camera 1000L or the camera 1000R, an optimal state as illustrated in FIG. 1 is lost, and the distance cannot accurately be measured. In such cases, the positional displacement that is caused by the optical-axis displacement between a pair of images (stereo images) needs to be measured and corrected using some sort of reference value. In the embodiments of the present disclosure described below, operations in which the positional displacement that is caused between a pair of images is corrected or adjusted are described.

Embodiments

Figure 2:
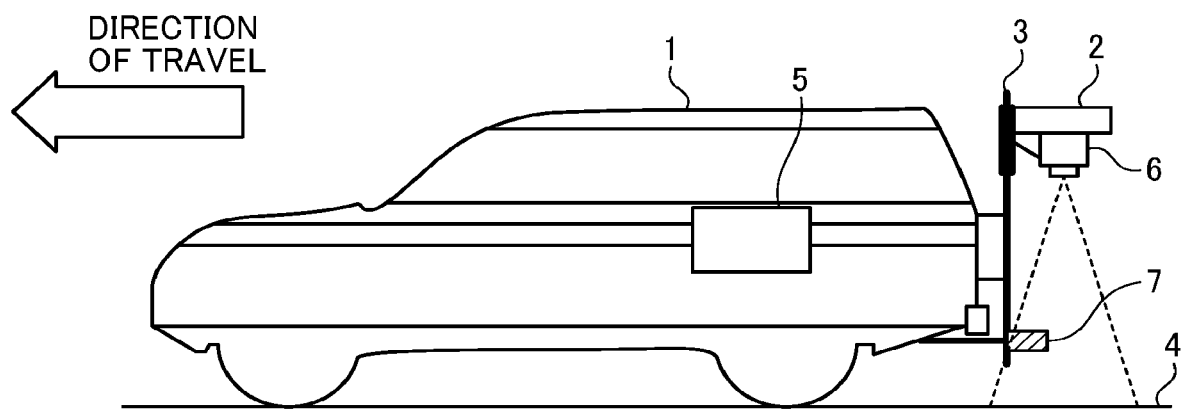
FIG. 2 is a diagram illustrating a configuration of an imaging system according to embodiments of the present disclosure.

FIG. 2 is a diagram illustrating a configuration of an imaging system according the present embodiment.

The arrangement of the stereo camera 6 in the imaging system is described below with reference to FIG. 2.

FIG. 2 illustrates a side view of the vehicle 1, where the imaging system according to the present embodiment is provided for the vehicle 1.

In FIG. 2, the direction of travel of the vehicle 1 is to the left side of the drawing. In other words, in FIG. 2, the left end of the vehicle 1 is the front of the vehicle 1, and the right end of the vehicle 1 is the rear of the vehicle 1.

In the imaging system according to the present embodiment, an attaching component 3 that is provided with an attaching part 2 for the imaging device is fixed onto the rear of the vehicle 1 that serves as a mobile object provided with the imaging system, and the stereo camera 6 is attached to the attaching part 2. In the example embodiment as illustrated in FIG. 2, it is assumed that one unit of stereo camera (i.e., the stereo camera 6) is attached to the attaching part 2. As illustrated in FIG. 2, a subject 7 is fixed to the attaching component 3 such that the capturing range of the stereo camera 6 covers the subject 7. As will be described later in detail, the subject 7 is used to adjust the displacement, in particular, the horizontal displacement in the horizontal directions (i.e., the directions in which a pair of cameras of the stereo camera 6 are arranged) of a captured image, which appears as a disparity error.

The stereo camera 6 is attached and oriented so as to capture a road surface 4 on which the vehicle 1 travels (an example of an object to be measured). More specifically, it is desired that the stereo camera 6 be attached so as to capture the road surface 4 in the vertical direction.

For example, the stereo camera 6 is controlled by a personal computer (PC) 5 disposed inside the vehicle 1. The PC 5 is an example of an information processing device. The operator manipulates the PC 5 to instruct the stereo camera 6 to start capturing an image. Once capturing instructions are given, the PC 5 to instructs the stereo camera 6 to start capturing an image. The timing at which an image is captured is controlled by the speed of the stereo camera 6, i.e., the speed of the vehicle 1, and such image capturing is repeated. Note also that the information processing device that controls the stereo camera 6 is not limited to the PC 5, and the information processing device may be, for example, a workstation or a device dedicated to controlling the stereo camera 6.

The stereo camera 6 simultaneously captures an object such as the road surface 4 in two or more different directions to obtain a pair of captured images (such a pair of captured images may be referred to as a stereo captured image in the following description). By so doing, the distance information indicating the distance to several points of the object can be obtained. Moreover, the three-dimensional road-surface data of the road surface, which is the object, can be generated based on the obtained distance information. By analyzing the generated three-dimensional road-surface data, the maintenance control index (MCI) of the pavement, which is an index used to evaluate the road condition of the road surface, can be obtained. The MCI quantitatively evaluates the quality of the pavement according to three kinds of road-condition values of a cracking ratio, rutting depth, and roughness. By analyzing the three-dimensional road-surface data, a cracking ratio, rutting depth, and roughness, which are used to calculate the MCI, can be obtained.

More specifically, the stereo camera 6 includes a pair of cameras that are apart from each other by predetermined base-line length, and outputs a pair of captured images (stereo captured images) that are captured by this pair of cameras. By searching for the corresponding point between such a pair of captured images included in this stereo captured images, the distance to a desired point in the captured image can be restored. The distances may be restored all over the captured image, and the data in which each pixel is indicated with a value of distance may be referred to as a depth map. In other words, a disparity image indicates the data of a group of three-dimensional points consisting of a group of points each of which has three-dimensional information.

The stereo camera 6 is attached to one place such as a rear part of the vehicle 1 in the downward direction so as to be able to capture an image of the road surface 4, and the vehicle 1 is moved along the road to be measured. For the sake of explanatory convenience, it is assumed that the capturing range of the stereo camera 6 provided for the vehicle 1 for the measurement covers predetermined length in the width direction of the road.

Then, for example, the operator operates the PC 5 to gives instructions to terminate the capturing operation as the capturing of a desired interval is finished. In response to the instructions to terminate the capturing operation, the PC 5 instructs the stereo camera 6 to stop capturing an image.

Figure 3:
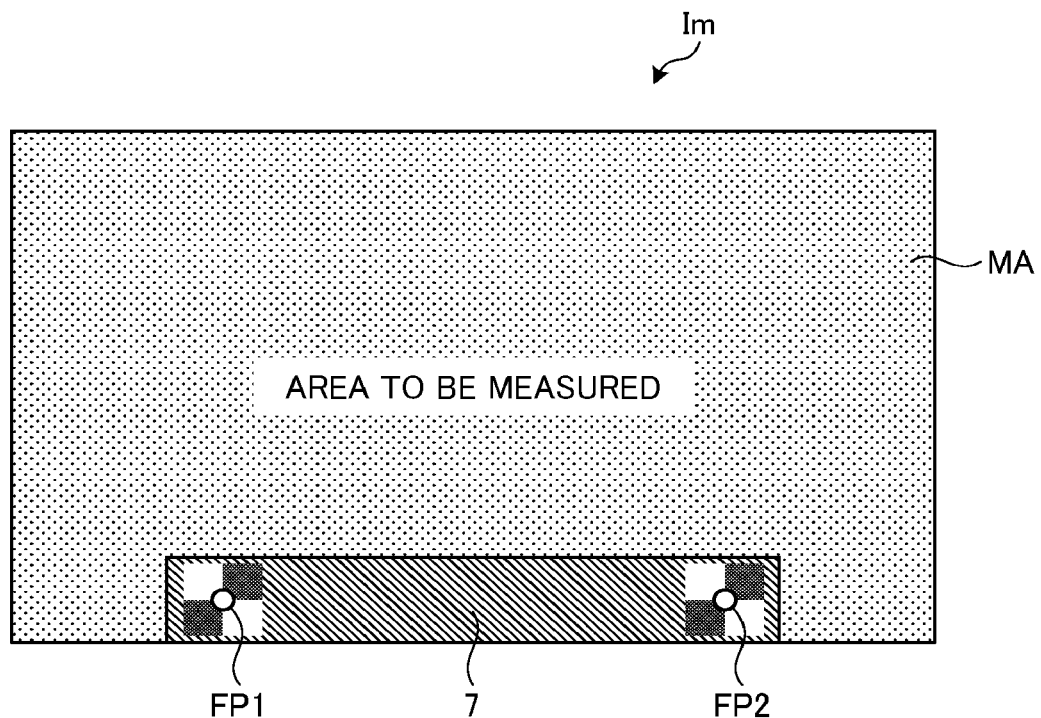
FIG. 3 is a diagram illustrating a captured image in which a subject with feature points are reflected, according to embodiments of the present disclosure.

FIG. 3 is a diagram illustrating a captured image Im in which the subject 7 with feature points are reflected, according to the present embodiment.

Figure 4A:
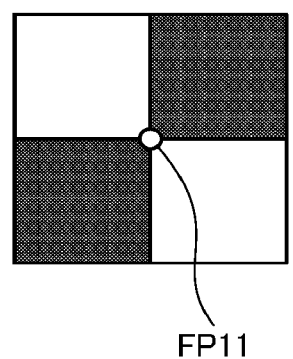
FIG. 4A, FIG. 4B, and FIG. 4C are diagrams each illustrating a feature point to be reflected in a subject, according to embodiments of the present disclosure.
Figure 4B:
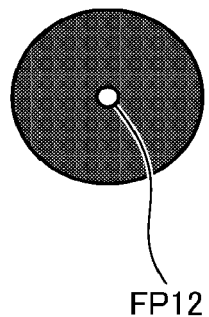
Figure 4C:
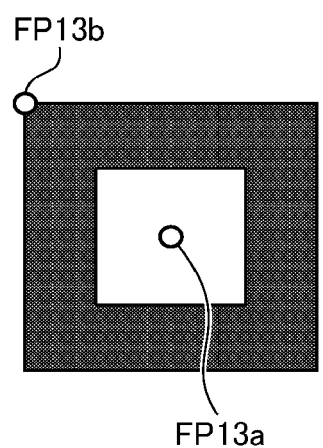

FIG. 4A, FIG. 4B, and FIG. 4C are diagrams each illustrating a feature point to be reflected in the subject 7, according to the present embodiment.

Some feature points of the subject 7 that is attached to the vehicle 1 are described below with reference to FIG. 3, FIG. 4A, FIG. 4B, and FIG. 4C.

As described above with reference to FIG. 2, the subject 7 is fixed to the attaching component 3 such that such that the capturing range of the stereo camera 6 covers the subject 7. For example, when a part of the attaching component 3 appears within the capturing range of the stereo camera 6, it is desired that the subject 7 be fixed to such a part of the attaching component 3. Accordingly, as illustrated in FIG. 4A, FIG. 4B, and FIG. 4C, the subject 7 appears on the captured image Im, which is captured by the stereo camera 6. Moreover, as illustrated in FIG. 4A, FIG. 4B, and FIG. 4C, checker patterns are drawn on the to-be-captured surface of the subject 7, and feature points FP1 and FP2 that are the grid points of such checker patterns are used to correct the horizontal displacement in a captured image in the horizontal directions. Note that such horizontal displacement appears as a disparity error. The area in the captured image Im (see FIG. 3) other than the area in which the subject 7 is reflected is used as an area to be measured MA where the road condition of the road surface is measured. For this reason, it is desired that the subject 7 be arranged so as not to disturb the measurement by the stereo camera 6.

As a matter of course, the patterns that are applied to the to-be-captured surface of the subject 7 to detect a feature point are not limited to the checker patterns as illustrated in FIG. 3. For example, the patterns as illustrated in FIG. 4A, FIG. 4B, and FIG. 4C may be used to detect a feature point.

FIG. 4A is a diagram illustrating the checker patterns same as those as illustrated in FIG. 3, and such a grid point may be used as a feature point (feature point FP11).

FIG. 4B is a diagram illustrating a painted-out circular pattern.

For example, the center of the circular pattern is detected and the pattern may be used as a feature point (feature point FP12).

FIG. 4C is a diagram illustrating a pattern in which a hollow rectangle is arranged inside the painted-out rectangle.

In such a configuration, for example, the center of the hollow rectangle is detected and the pattern may be used as a feature point (feature point FP13a). Alternatively, a vertex of the painted-out rectangle may be detected and the pattern may be used as a feature point (feature point FP13b).

FIG. 5A and FIG. 5B are diagrams each illustrating various kinds of errors caused by the optical-axis displacement, according to the present embodiment.

Various kinds of errors that are caused by the optical-axis displacement are described below with reference to FIG. 5A and FIG. 5B.

In the present embodiment, various kinds of physical values are described with reference to the signs as indicated in FIG. 5A and FIG. 5B. Note also that it is assumed in the description given below that the distance $S_{real}$ between the feature points FP1 and FP2 of the subject 7 in the real space, the base-line length B of the stereo camera 6 (see FIG. 1), and the focal length f (see FIG. 1) do not change before and after optical-axis displacement occurs.

Apart from the optical-axis displacement, the distance between the stereo camera 6 and the subject 7 may change due to the difference in capturing timing of the stereo camera 6 or due to the changes in the fixing condition of the stereo camera 6 or the subject 7 as the vehicle 1 vibrates. When it is assumed that the distance between the stereo camera 6 and the subject 7 remains unchanged, the subject 7 needs to be fixed to the attaching component 3 in a strict sense, which may be impossible to achieve. For this reason, it is assumed in the following description that the distance between the stereo camera 6 and the subject 7 changes as illustrated in FIG. 5A and FIG. 5B. In such cases, the distance before the distance between the stereo camera 6 and the subject 7 changes (i.e., the distance in the initial state) is referred to as Z, and the distance after the distance between the stereo camera 6 and the subject 7 changes is referred to as Z'. The disparity also changes accordingly. Due to such a configuration, the disparity before the distance between the stereo camera 6 and the subject 7 changes is referred to as d, and the disparity after the distance between the stereo camera 6 and the subject 7 has changed is referred to as d'. Further, the distance between the feature points FP1 and FP2 of the subject 7 on the image captured by the stereo camera 6 (such distance may be referred to as the distance between a pair of feature points on the image in the following description) may also change. Due to such a configuration, the distance between a pair of feature points on the image before the distance between the stereo camera 6 and the subject 7 changes is referred to as $S_{min}$, and the distance between a pair of feature points on the image after the distance between the stereo camera 6 and the subject 7 has changed is referred to as S' img.

When the displacements in optical axis occur in each one of the pair of monocular cameras of the stereo camera 6, the position on the subject 7 at which an image is formed is displaced from an optimal condition. The amount of change in the disparity d, i.e., the disparity error (horizontal displacement), under such circumstances is referred to as Δd. Moreover, the detection error when the imaging devices of each camera detects a feature point is referred to as ΔS.

FIG. 6A and FIG. 6B are diagrams each illustrating a method of calculating the amount of vertical displacement, according to the present embodiment.

A method of calculating the amount of change in vertical displacement (i.e., the amount of vertical displacement) caused by the optical-axis displacement is described below with reference to FIG. 6A and FIG. 6B.

In the above embodiment described with reference to FIG. 5A and FIG. 5B, cases in which the disparity error Δ, which is horizontal displacement, occurs due to the displacement caused in optical axis are described. However, in actuality, as illustrated in FIG. 6A and FIG. 6B, there may be some cases where vertical displacement, which is the displacement on a captured image in the vertical direction, occurs. An example of the stereo captured image captured by the stereo camera 6 when vertical displacement occurs is illustrated in FIG. 6A and FIG. 6B.

A captured image Im1L as illustrated in FIG. 6A is an image captured by one of the pair of cameras of the stereo camera 6, and a captured image Im1R as illustrated in FIG. 6B is an image captured by the other one of the pair of cameras of the stereo camera 6. Under optimal conditions, no vertical displacement occurs in the stereo captured images captured by the stereo camera 6, and the amount of vertical displacement Δvd is 0 regardless of the distance of the multiple subjects appearing on the stereo captured images. When vertical displacement occurs due to the optical-axis displacement, as illustrated in FIG. 6A and FIG. 6B, feature points FP21L and FP21R that correspond to each other between a pair of stereo captured images are detected. Due to this configuration, the amount of vertical displacement $\Delta_{vd}$ can be measured. Then, correction (adjustment) is performed using a correction parameter such that the amount of vertical displacement Δvd becomes zero. As the vertical displacement does not depend on the distance, it is not always necessary to detect a feature point from the subjects 7 appearing on the captured images Im1L and Im1R. In other words, as illustrated in FIG. 6A and FIG. 6B, if a pair of matched feature points (for example, the feature points FP21L and FP21R) of another subject (for example, road surface) that appears on the area to be measured between a pair of right and left captured images can be detected, the amount of vertical displacement Δvd can be calculated and obtained.

As described above, a disparity error, which is horizontal displacement, occurs due to the displacement caused in optical axis. If the vertical displacement is corrected in advance before such a disparity error is corrected, the object to be corrected can be limited to the disparity error that is the horizontal displacement. When the vertical displacement is corrected in an independent manner, the feature points of the entirety of a captured image can be used. By so doing, the number of feature points that can be used for correction increases, and the accuracy of the correction improves.

FIG. 7A and FIG. 7B are diagrams each illustrating a disparity error caused by the displacements in optical axis, according to the present embodiment.

Figure 8:
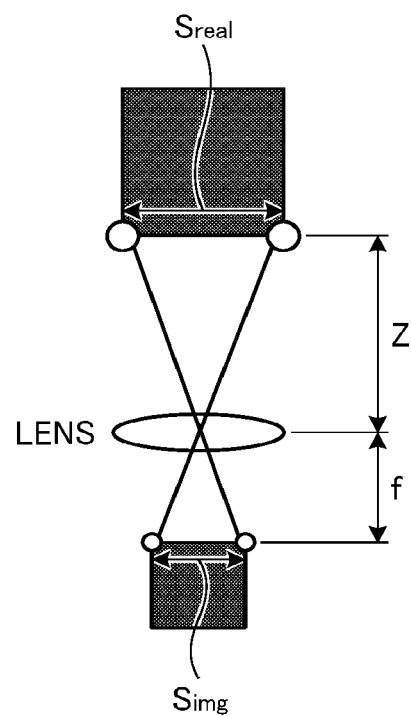
FIG. 8 is a diagram illustrating the relation between the distance between a pair of feature points in the real space and the distance between a pair of feature points on the image, according to embodiments of the present disclosure.

FIG. 8 is a diagram illustrating the relation between the distance $S_{real}$ between a pair of feature points in the real space and the distance $S_{img}$ between a pair of feature points on the image, according to the present embodiment.

A method of calculating a disparity error, which is the horizontal displacement caused by the optical-axis displacement, is described below with reference to FIG. 7A, FIG. 7B, and FIG. 8.

As the displacements in optical axis occur, horizontal displacement occurs as if each one of the right and left captured images of the stereo captured images shifts in the horizontal direction. As a result, a disparity error occurs. In such cases, the right and left cameras of the stereo camera 6 are displaced in an independent manner. Accordingly, an error occurs in the disparity that is calculated from the right and left captured images.

In the present embodiment, cases in which the distance between the stereo camera 6 and the subject 7 does not change even when optical-axis displacement occurs are described. In such cases, the positions of the feature points of the subjects 7 appearing on the captured images change due to the displacements in optical axis. However, the distance between a pair of feature points is maintained. The amount of horizontal displacement $\Delta Lx_t$, which is the displacement in the horizontal direction between the positions of the feature points of the subject 7 on a captured image Im2L as illustrated in FIG. 7A before the disparity error occurs due to the displacements in optical axis and the positions of the feature points of the subject 7 on a captured image Im2L' as illustrated in FIG. 7B after the disparity error has occurred due to the displacements in optical axis, is measured. In a similar manner, the amount of horizontal displacement $\Delta Rx_t$, which is the displacement in the horizontal direction between the positions of the feature points of the subject 7 on a captured image Im2R as illustrated in FIG. 7A before the disparity error occurs due to the displacements in optical axis and the positions of the feature points of the subject 7 on a captured image Im2R' as illustrated in FIG. 7B after the disparity error has occurred due to the displacements in optical axis, is measured. Then, the sum of the amount of horizontal displacement $\Delta Lx_t$ and the amount of horizontal displacement $\Delta Rx_t$, which are separately measured, is calculated. By so doing, the disparity error $\Delta d$ ($=\Delta Lx_t+\Delta Rx_t$) can be calculated and obtained. Then, correction (adjustment) may be performed using a correction parameter to make the disparity error $\Delta d$ become zero. As a result, the disparity error can be cancelled.

However, in actuality, as described as above with reference to FIG. 5, the distance between the stereo camera 6 and the subject 7 may change due to, for example, the changes in temperature, vibration, or the changes over time in addition to the displacements in optical axis. In such cases, the distance between the stereo camera 6 and the subject 7 changes according to various types of changes. For this reason, regarding the distance $S_{img}$ between a pair of feature points on the image as illustrated in FIG. 8, the distance $S_{img}$ between a pair of feature points on the image cannot be used to calculate the disparity error $\Delta d$, and the disparity error $\Delta d$ cannot be corrected or adjusted. In order to handle such a situation, the fact that the distance $S_{real}$ between a pair of feature points of the subject 7 in the real space remains unchanged is used to measure the disparity error $\Delta d$.

The relation between the distance $S_{real}$ between a pair of feature points in the real space and the distance $S_{img}$ between a pair of feature points on the image is as illustrated in FIG. 8. In view of these circumstances, the distance $S_{real}$ between a pair of feature points in the real space can be expressed as in a first equation given below.

$$S_{real} = \frac{S_{img} \cdot Z}{f} \quad \text{First Equation}$$

In this equation, Z denotes the distance between the stereo camera 6 and the subject 7, and f denotes the focal length. The distance Z between the stereo camera 6 and the subject 7 can be expressed in a second equation given below in which the disparity d obtained from a pair of stereo captured images is converted into the distance Z.

$$Z = \frac{B \cdot f}{d} \quad \text{Second Equation}$$

If the distance Z that is indicated by the second equation is substituted into the above first equation, a third equation as given below is obtained.

$$S_{real} = \frac{S_{img} \cdot B}{d} \quad \text{Third Equation}$$

As described above, when the displacements in optical axis occur, an error is included in the disparity d as the disparity error $\Delta d$. Further, as described above, the distance between the stereo camera 6 and the subject 7 may change. Accordingly, assuming that the disparity after the distance is changed and the distance between a pair of feature points on the image are referred to as d' and $S'_{img}$, respectively, the distance S' real between a pair of feature points in the real space after the distance is changed is expressed in a fourth equation given below.

$$S'_{real} = \frac{S'_{img} \cdot B}{d' + \Delta d} \quad \text{Fourth Equation}$$

However, the above distance between a pair of feature points in the real space remains unchanged. Accordingly, the disparity error $\Delta d$ can be calculated by a fifth equation given below.

$$S_{real} = S'_{real} \frac{S_{img} \cdot B}{d} = \frac{S'_{img} \cdot B}{d' + \Delta d} \quad \text{Fifth Equation}$$

$$\Delta d = \frac{S'_{img}}{S_{img}} d - d'$$

Figure 9:
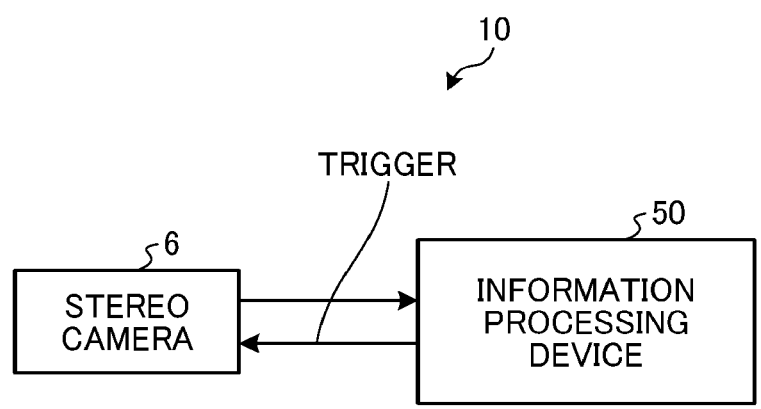
FIG. 9 is a schematic diagram illustrating a configuration of an imaging system according to embodiments of the present disclosure.

FIG. 9 is a schematic diagram illustrating a configuration of the imaging system 10 according the present embodiment.

A schematic configuration of the imaging system 10 according to the present embodiment is described below with reference to FIG. 9.

As illustrated in FIG. 9, the imaging system 10 includes the stereo camera 6 and the information processing device 50 (an example of a measuring device) that correspond to the PC 5 as illustrated in FIG. 2.

The information processing device 50 generates a trigger at a prescribed timing, and sends the generated trigger to the stereo camera 6. The stereo camera 6 captures images according to the received trigger. The multiple stereo captured images that are captured by the stereo camera 6 are sent to the information processing device 50. The information processing device 50 stores and accumulates the multiple stereo captured images that are received from the stereo camera 6 in, for example, a storage device. The information processing device 50 corrects the positional displacement (vertical displacement, disparity error) on the accumulated stereo captured images, which is caused by the optical-axis displacement, and then generates a depth map (distance information).

Figure 10:
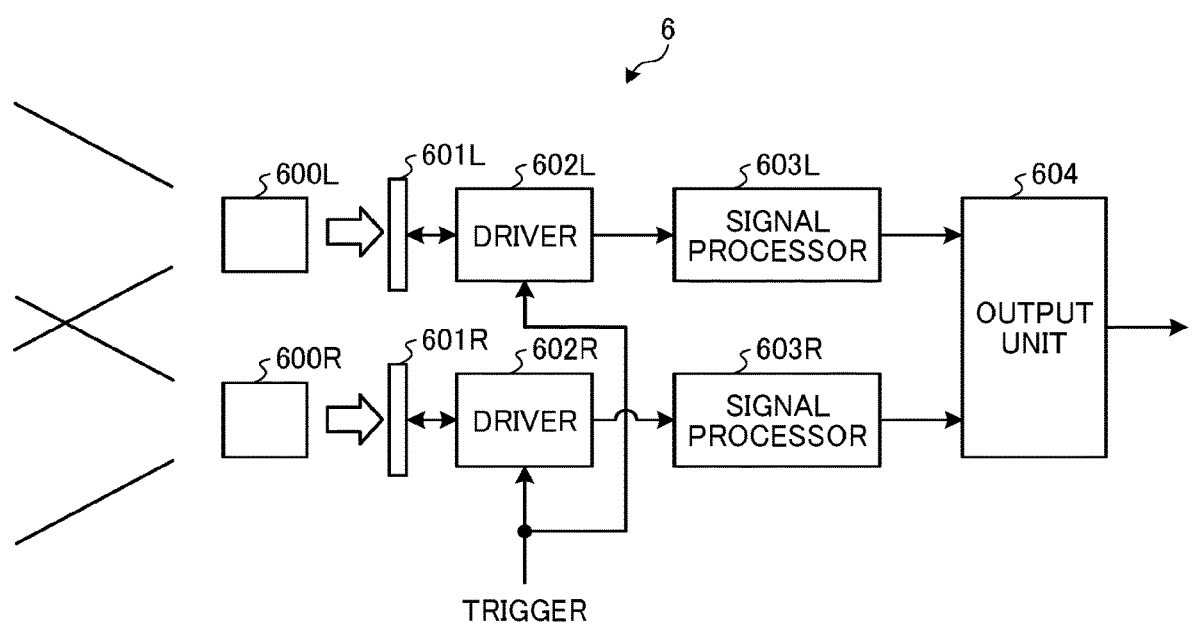
FIG. 10 is a schematic block diagram illustrating a hardware configuration of a pair of stereo cameras according to embodiments of the present disclosure.

FIG. 10 is a schematic block diagram illustrating a hardware configuration of the stereo camera 6, according to the present embodiment.

A hardware configuration of the stereo camera 6 according to the present embodiment is described with reference to FIG. 10.

As illustrated in FIG. 10, the stereo camera 6 includes a pair of imaging optical systems 600L and 600R, a pair of imaging devices 601L and 601R, drivers 602L and 602R, signal processors 603L and 603R, and an output unit 604.

The imaging optical system 600L has a prescribed angle of view and prescribed focal length f, and projects the light from the subject onto the imaging device 601L.

The imaging device 601L is an optical sensor that uses, for example, a complementary metal oxide semiconductor (CMOS), and outputs a signal according to the projected light. Alternatively, an optical sensor using a charge coupled device (CCD) may applied to the imaging device 601L.

The driver 602L drives the imaging device 601L, and performs predetermined processing such as noise reduction and gain modification on the signals output from the imaging device 601L and outputs the processed signals.

The signal processor 603L performs analog-to-digital (A/D) conversion on the signals output from the driver 602L to convert the obtained signals into digitized image signals (captured images). The signal processor 603L performs predetermined image processing such as gamma correction on the converted image signal and outputs a processed captured image. The captured image that is output from the signal processor 603L is sent to the output unit 604.

Note also that the operations of an imaging optical system 600R, an imaging device 601R, a driver 602R, and a signal processor 603R are equivalent to the operations of the above-described imaging optical system 600L, the imaging device 601L, the driver 602L, and the signal processor 603L, respectively.

A trigger that is output from, for example, the information processing device 50 is sent to the drivers 602L and 602R. Then, the drivers 602L and 602R import a signal from the imaging devices 601L and 601R at a timing indicated by the received trigger, and capture images.

In the present embodiment, the drivers 602L and 602R drive the pair of imaging devices 601L and 601R to perform exposures on the entire screen at a single instant in time. This method of image capture is called global shutter. By contrast, rolling shutter is a method in which the light is taken in the order from top to bottom of the pixel arrangement (in the order of lines). For this reason, each line of the frames that are captured by the rolling shutter is not captured at the same time in a strict sense. In rolling shutter, when the camera or the subject moves at high speed while the captured signals of one frame are being taken in, the images of the subject are captured in a misaligned manner for each of the positions of line. Accordingly, the stereo camera 6 according to the present embodiment adopts global shutter such that the shape of the road will be captured accurately in a geometric sense.

The output unit 604 outputs the captured images of each frame, which are supplied from the signal processors 603L and 603R, as a pair of stereo captured images. The stereo captured images that are output from the output unit 604 are sent to the information processing device 50 and is accumulated.

Figure 11:
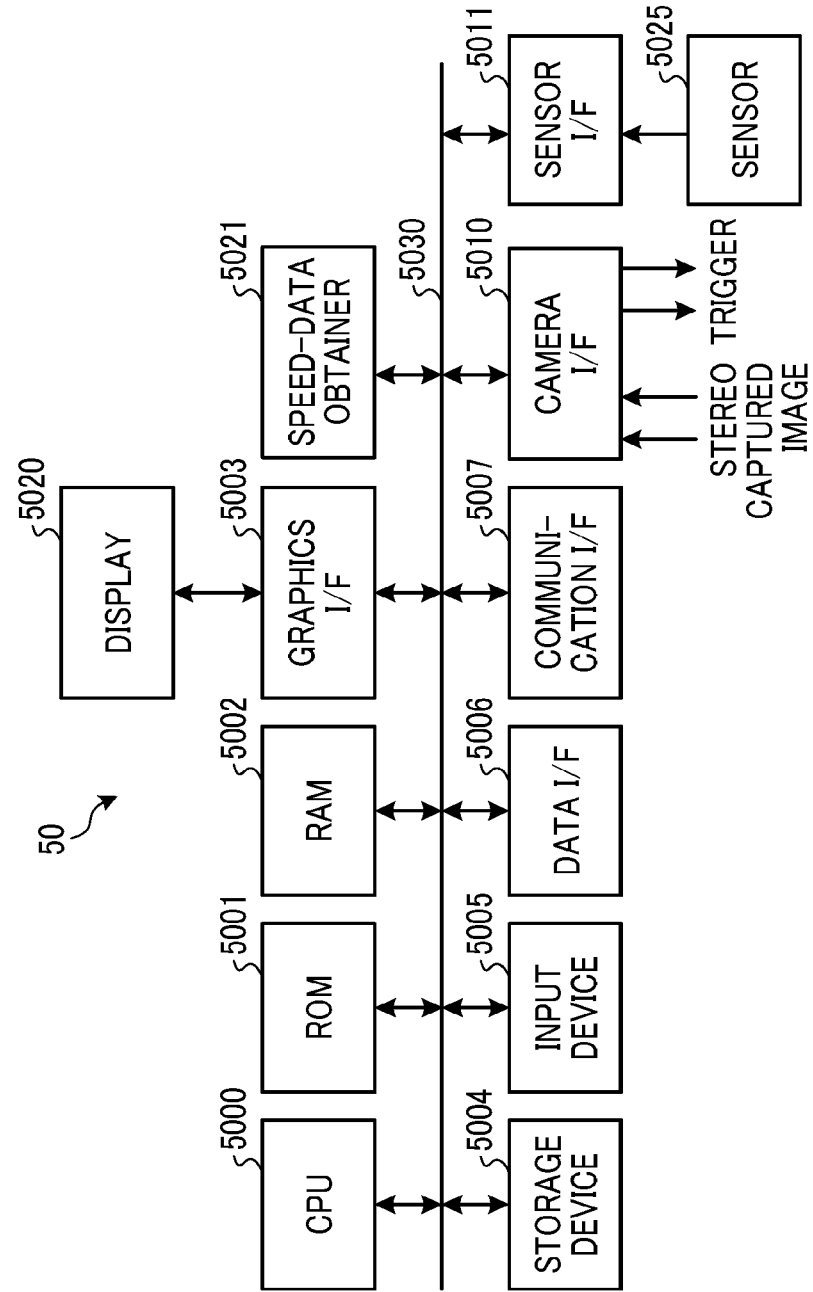
FIG. 11 is a diagram illustrating a hardware configuration of an information processing device according to embodiments of the present disclosure.

FIG. 11 is a diagram illustrating a hardware configuration of the information processing device 50 according to the present embodiment.

A hardware configuration of the information processing device 50 according to the present embodiment is described below with reference to FIG. 11.

As illustrated in FIG. 11, the information processing device 50 includes a central processing unit (CPU) 5000, a read only memory (ROM) 5001, a random access memory (RAM) 5002, a graphics interface (I/F) 5003, a storage device 5004, an input device 5005, a data interface (I/F) 5006, and a communication interface (I/F) 5007, each of which is coupled to a bus 5030. Further, the information processing device 50 includes a camera interface (I/F) 5010, a sensor interface (I/F) 5011, and a speed-data obtainer 5021, each of which is coupled to a bus 5030.

The storage device 5004 is a storage medium in which data is stored in a nonvolatile manner. The storage device 5004 may be, for example, a hard disk drive (HDD) or a solid state drive (SSD). Moreover, the storage device 5004 stores a program and data that the CPU 5000 uses for operation.

The CPU 5000 uses the RAM 5002 as a working memory, and controls all operations of the information processing device 50 according to, for example, a program stored in advance in at least one of the ROM 5001 or the storage device 5004.

The graphics interface 5003 generates a display signal to be handled by the display 5020, based on the display-control signal that is generated by the CPU 5000 according to a program. The display 5020 displays a screen according to a display signal that is supplied by the graphics interface 5003.

The input device 5005 accepts an operation made by a user, and outputs a control signal according to the accepted operation made by the user. The input device 5005 may be, for example, a keyboard or a pointing device such as a mouse or a tablet personal computer (PC). Alternatively, the input device 5005 and the display 5020 may integrally be formed, and a so-called touch-panel configuration may be adopted.

The data interface 5006 performs the transmission and reception of data with an external device. The data interface 5006 may be, for example a universal serial bus (USB). The communication interface 5007 controls the communication with an external network in accordance with the instructions given from the CPU 5000.

The camera interface 5010 is an interface for each camera of the stereo camera 6. The multiple stereo captured images that are output from the stereo camera 6 are passed to, for example, the CPU 5000 through the camera interface 5010. Moreover, the camera interface 5010 generates the above-described trigger according to the instructions given from the CPU 5000, and sends the generated trigger to the stereo camera 6.

The sensor interface 5011 is an interface with a sensor 5025 that detects at least one of the temperature or acceleration. The sensor interface 5011 receives the detection information (for example, temperature information and acceleration information) detected by the sensor 5025, and sends the received detection information to, for example, the CPU 5000. For example, the sensor 5025 may be arranged near the place at which the stereo camera 6 is disposed.

The speed-data obtainer 5021 obtains speed information that indicates the speed of the vehicle 1. When the stereo camera 6 is attached to the vehicle 1, the speed information that is obtained by speed-data obtainer 5021 indicates the speed of the stereo camera 6 with reference to the object (i.e., the road surface). For example, the speed-data obtainer 5021 has a function to receive a signal of a global navigation satellite system (GNSS), and obtains the speed information that indicates the speed of the vehicle 1 based on the Doppler effect of the received signal of the GNSS. However, no limitation is intended thereby, and the speed-data obtainer 5021 may obtain the speed information directly from the vehicle 1.

Figure 12:
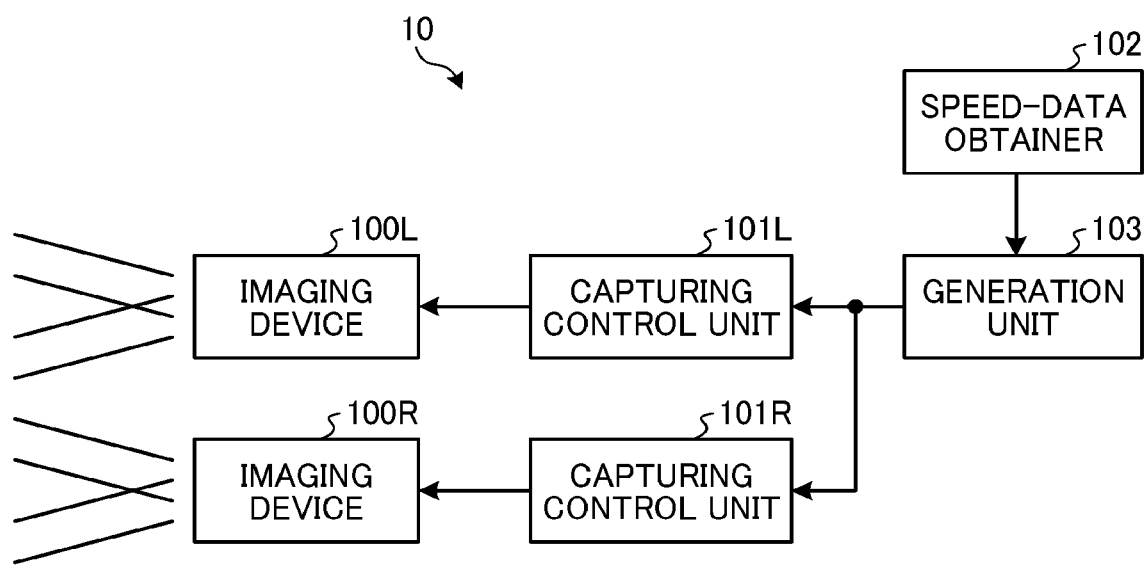
FIG. 12 is a diagram illustrating a configuration of the functional blocks of an imaging system according to embodiments of the present disclosure.

FIG. 12 is a diagram illustrating a configuration of the functional blocks of the imaging system 10 according to the present embodiment.

Operations and a configuration of the functional blocks of the imaging system 10 according to the present embodiment are described below with reference to FIG. 12.

As illustrated in FIG. 12, the imaging system 10 includes imaging devices 100L and 100R, capturing control units 101L and 101R, a speed-data obtainer 102, and a generation unit 103.

The imaging devices 100R and 100L correspond to the right and left monocular cameras of the stereo camera 6, respectively. The capturing control units 101R and 101L controls capturing operation such as a capturing timing, exposure, and shutter speed of the imaging devices 100R and 100L, respectively.

The speed-data obtainer 102 obtains the speed of the imaging devices 100L and 100R with reference to the object (i.e., the road surface 4). The speed-data obtainer 102 is implemented by the speed-data obtainer 5021 as illustrated in FIG. 11.

The generation unit 103 generates a trigger that specifies an image captured by the imaging devices 100L and 100R based on the speed information obtained by speed-data obtainer 102 and the view in the direction of travel. The generation unit 103 sends the generated trigger to the capturing control units 101R and 101L. The capturing control units 101R and 101L causes the imaging devices 100L and 100R to perform capturing operation according to the trigger sent from the generation unit 103. For example, the generation unit 103 is implemented as the CPU 5000 as illustrated in FIG. 11 executes a program.

Figure 13:
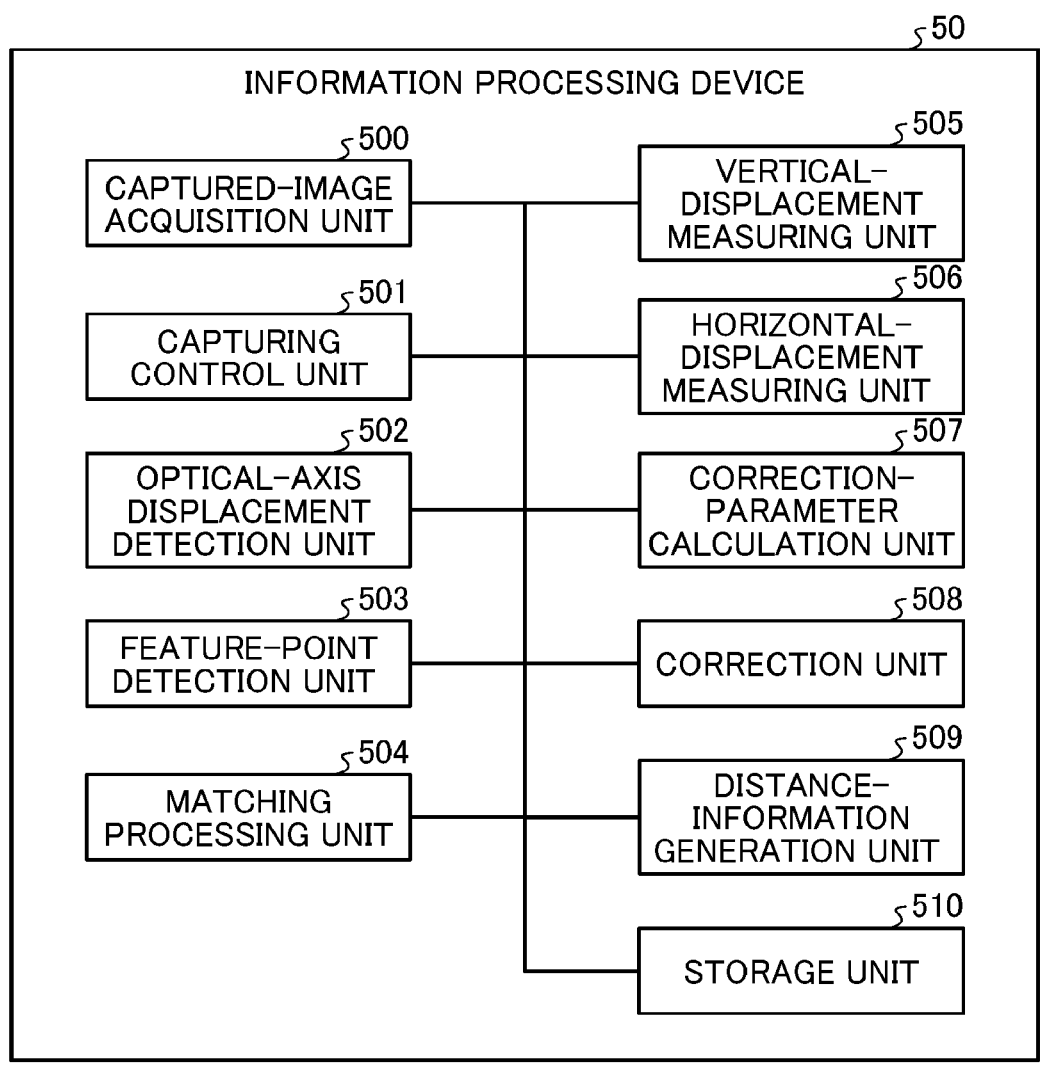
FIG. 13 is a block diagram illustrating a configuration of the functional blocks of an information processing device according to embodiments of the present disclosure.

FIG. 13 is a block diagram illustrating a configuration of the functional blocks of the information processing device 50 according to the present embodiment.

Operations and a configuration of the functional blocks of the information processing device 50 according to the present embodiment are described below with reference to FIG. 13.

As illustrated in FIG. 13, the information processing device 50 includes a captured-image acquisition unit 500 (acquisition unit), a capturing control unit 501, an optical-axis displacement detection unit 502 (detection unit), a feature-point detection unit 503 (detection unit), a matching processing unit 504, a vertical-displacement measuring unit 505 (second measuring unit or another measuring unit), a horizontal-displacement measuring unit 506 (first measuring unit or measuring unit), a correction-parameter calculation unit 507 (calculation unit), a correction unit 508, a distance-information generation unit 509 (generation unit), and a storage unit 510.

The captured-image acquisition unit 500 is a functional unit to obtain a pair of stereo captured images from the stereo camera 6. The captured-image acquisition unit 500 controls the storage unit 510 to store the obtained stereo captured image. The captured-image acquisition unit 500 obtains the stored stereo captured image from storage unit 510.

The capturing control unit 501 is a functional unit that controls the capturing operation of the stereo camera 6. More specifically, for example, the capturing control unit 501 obtains speed information that indicates the speed of the stereo camera 6 with reference to the subject (i.e., the road surface 4), and generates a trigger used to instruct the stereo camera 6 to capture an image, based on the obtained speed information and the predetermined angle of view and height of the stereo camera 6. The capturing control unit 501 corresponds to the capturing control units 101L and 101R, the speed-data obtainer 102, and the generation unit 103 as illustrated above in FIG. 12.

The optical-axis displacement detection unit 502 is a functional unit that detects displacements caused in optical axis. In the present embodiment, the term "displacements caused in optical axis" includes not only a state in which displacements actually occur on the optical axis of a camera but also a state in which displacements in optical axis occur with a high probability. For example, when the value of the amount of change in the temperature that is detected by the sensor 5025 (an example of detection information) is equal to or greater than a predetermined value and such a change in temperature is caused by vibration, the optical-axis displacement detection unit 502 detects the displacements in optical axis when the acceleration that is detected by the sensor 5025 (an example of detection information) indicates a predetermined vibrational state. Alternatively, when the value of the amount of change in the temperature that is detected by the sensor 5025 (an example of detection information) is equal to or greater than a predetermined value and such a change in temperature is caused by aged deterioration, the optical-axis displacement detection unit 502 detects the displacements in optical axis when the length of accumulated operation time is equal to or longer than predetermined length of time.

The feature-point detection unit 503 is a functional unit that detects a feature point on a stereo captured image obtained by the captured-image acquisition unit 500. For example, the feature-point detection unit 503 detects a feature point from a pattern such as checker patterns of the subjects 7 appearing on the stereo captured images, or detects a feature point from the area to be measured MA. In such cases, for example, the grain shape or the bumps and dips (irregularities) of the asphalt-paved road surface 4 are detected as a feature point from the area to be measured MA.

The matching processing unit 504 is a functional unit that performs matching processes on a pair of feature points of a pair of stereo captured images detected by the feature-point detection unit 503. As such matching processes, for example, block matching may be used in which a plurality of areas are cropped from a pair of images to be compared with each other and, for example, the sum of absolute difference (SAD) of the differences in brightness, the sum of squared difference (SSD) of the differences in brightness, and the zero-mean normalized cross-correlation (ZNCC) of the cropped areas are calculated in order to evaluate the affinity between a pair of images.

The vertical-displacement measuring unit 505 is a is a functional unit that measures the amount of vertical displacement between a pair of stereo captured images, which is caused due to, for example, the optical-axis displacement. More specifically, the vertical-displacement measuring unit 505 measures the amount of vertical displacement using the feature points detected by the feature-point detection unit 503 over the entirety of the captured images. Due to such a configuration, the number of feature points to be used for the correction of vertical displacement increases, and the accuracy of the correction improves.

The horizontal-displacement measuring unit 506 is a functional unit that measures the horizontal displacement caused due to the optical-axis displacement between a pair of stereo captured images, i.e., the disparity error Δd. More specifically, the horizontal-displacement measuring unit 506 uses the above fifth equation to calculate the disparity error Δd.

The correction-parameter calculation unit 507 is a functional unit that calculates a vertical-displacement correction parameter (second correction parameter) based on the amount of vertical displacement calculated by the vertical-displacement measuring unit 505 and calculates a horizontal-displacement correction parameter (first correction parameter) based on the disparity error Δd calculated by the horizontal-displacement measuring unit 506. For example, the correction-parameter calculation unit 507 expresses a vertical-displacement correction parameter, which is used to correct the amount of vertical displacement (to make the amount of vertical displacement become zero) measured by the vertical-displacement measuring unit 505, as a rotation matrix, and expresses a horizontal-displacement correction parameter, which is used to correct the disparity error Δd (to make the disparity error Δd become zero) measured by the horizontal-displacement measuring unit 506, as the amount of shift on the entire image.

The correction unit 508 is a functional unit that uses the vertical-displacement correction parameter and horizontal-displacement correction parameter calculated by the correction-parameter calculation unit 507 to correct each one of the vertical displacement and the disparity error Δd caused by, for example, the optical-axis displacement.

The distance-information generation unit 509 using the stereo captured images that are corrected by the correction unit 508 is a functional unit that generates a depth map (distance information).

The storage unit 510 is a functional unit that stores, for example, the pair of stereo captured images that are obtained by the stereo camera 6 and the stereo captured images that are corrected by the correction unit 508. The storage unit 510 is implemented by at least one of the RANI 5002 or the storage device 5004 as illustrated in FIG. 11.

The capturing control unit 501, the optical-axis displacement detection unit 502, the feature-point detection unit 503, the matching processing unit 504, the vertical-displacement measuring unit 505, the horizontal-displacement measuring unit 506, the correction-parameter calculation unit 507, the correction unit 508, and the distance-information generation unit 509 as described above are implemented as the CPU 5000 as illustrated in FIG. 11 executes a program. Some of or all of the capturing control unit 501, the optical-axis displacement detection unit 502, the feature-point detection unit 503, the matching processing unit 504, the vertical-displacement measuring unit 505, the horizontal-displacement measuring unit 506, the correction-parameter calculation unit 507, the correction unit 508, and the distance-information generation unit 509 may be implemented by hardware circuitry (integrated circuit (IC)) such as a field-programmable gate array (FPGA) or an application specific integrated circuit (ASIC), in place of a software program.

The captured-image acquisition unit 500, the capturing control unit 501, the optical-axis displacement detection unit 502, the feature-point detection unit 503, the matching processing unit 504, the vertical-displacement measuring unit 505, the horizontal-displacement measuring unit 506, the correction-parameter calculation unit 507, the correction unit 508, the distance-information generation unit 509, and the storage unit 510 of the information processing device 50 as illustrated in FIG. 13 merely indicate functions schematically, and no limitation is intended by such configurations. For example, a plurality of functional units that are illustrated as independent functional units in the information processing device 50 as illustrated in FIG. 13 may be configured as a single functional unit. Alternatively, the function of a single functional unit in the information processing device 50 as illustrated in FIG. 13 may be divided into a plurality of functions implemented by a plurality of functional units.

Figure 14:
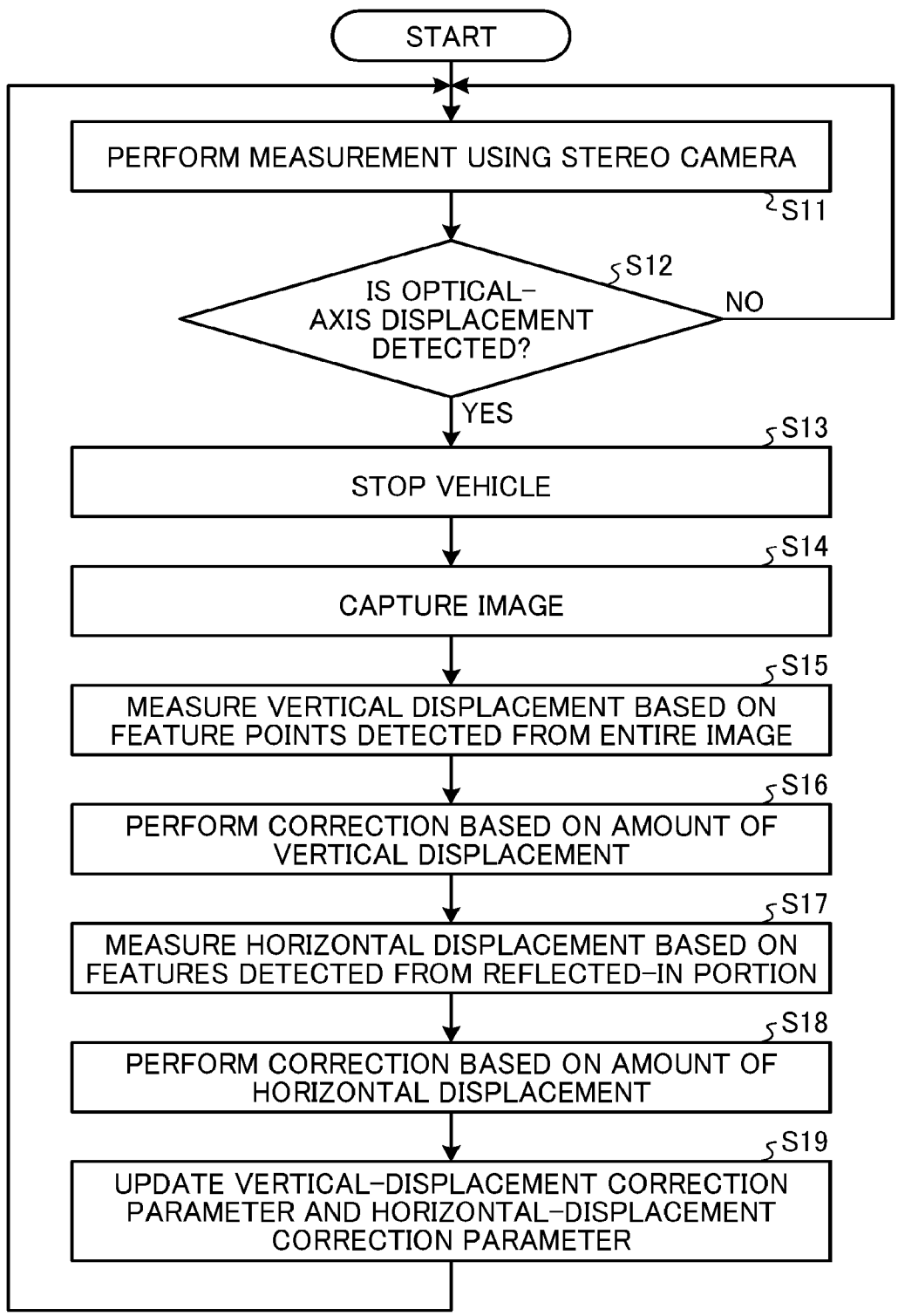
FIG. 14 is a flowchart of how a correction parameter is obtained in an imaging system, according to embodiments of the present disclosure.

FIG. 14 is a flowchart of how a correction parameter is obtained in the imaging system 10, according to the present embodiment.

How a correction parameter is obtained in the imaging system 10 according to the present embodiment is described below with reference to FIG. 14.

Step S11

In the imaging system 10, once the input device 5005 of the information processing device 50 is operated to instruct the stereo camera 6 to start capturing operation while the vehicle 1 is travelling, the capturing control unit 501 of the information processing device 50 causes the stereo camera 6 to start capturing operation. Once the stereo camera 6 starts capturing operation, the captured-image acquisition unit 500 of the information processing device 50 obtains the captured stereo captured image. Then, the process shifts to the processes in a step S12.

Step S12

The optical-axis displacement detection unit 502 of the information processing device 50 detects whether or not an optical-axis displacement has occurred. For example, when the value of the amount of change in the temperature that is detected by the sensor 5025 is equal to or greater than a predetermined value and such a change in temperature is caused by vibration, the optical-axis displacement detection unit 502 detects the displacements in optical axis when the acceleration that is detected by the sensor 5025 indicates a predetermined vibrational state. Alternatively, when the value of the amount of change in the temperature that is detected by the sensor 5025 is equal to or greater than a predetermined value and such a change in temperature is caused by aged deterioration, the optical-axis displacement detection unit 502 detects the displacements in optical axis when the length of accumulated operation time is equal to or longer than predetermined length of time, in descending order. When some optical-axis displacement is detected by the optical-axis displacement detection unit 502 ("YES" in the step S12), the process shifts to the processes in a step S13. When no optical-axis displacement is detected by the optical-axis displacement detection unit 502 ("NO" in the step S12), the process return to the processes in the step S11.

Step S13

When the displacements in optical axis are detected by the optical-axis displacement detection unit 502, the operator makes the vehicle 1 stop moving so as to execute the image acquisition and image processing in a subsequent stage with stability. In so doing, it is not always necessary to make the vehicle 1 stop moving completely, and it may be sufficient to make the speed of the vehicle 1 slower than predetermined speed. Then, the process shifts to the processes in a step S14.

Step S14

Once the vehicle 1 stops moving, the stereo camera 6 captures an image of the road surface 4, and the captured-image acquisition unit 500 of the information processing device 50 obtains a stereo captured image captured by the stereo camera 6. Then, the process shifts to the processes in a step S15.

Step S15

The feature-point detection unit 503 of the information processing device 50 detects a feature point on a stereo captured image obtained by the captured-image acquisition unit 500. More specifically, the feature-point detection unit 503 detects a feature point from a pattern such as checker patterns of the subjects 7 appearing on the stereo captured images, or detects a feature point from the area to be measured MA. Subsequently, the matching processing unit 504 of the information processing device 50 performs matching processes on a pair of feature points of a pair of stereo captured images detected by the feature-point detection unit 503. The matching processes are same as above.

After the matching processes of a pair of feature points are done, firstly, the vertical-displacement measuring unit 505 of the information processing device 50 measures the amount of vertical displacement between a pair of stereo captured images in order to correct the vertical displacement. In so doing, the optimal value of the amount of vertical displacement is 0 regardless of the distance of the multiple subjects appearing on entire area of the stereo captured images. Accordingly, the vertical-displacement measuring unit 505 measures the amount of vertical displacement using the feature points detected by the feature-point detection unit 503 over the entirety of the captured images. Then, the process shifts to the processes in a step S16.

Step S16 the correction-parameter calculation unit 507 of the information processing device 50 calculates a vertical-displacement correction parameter that is expressed in, for example, a rotation matrix, based on the amount of vertical displacement calculated by the vertical-displacement measuring unit 505. Then, the correction unit 508 of the information processing device 50 corrects the vertical displacement caused by, for example, the optical-axis displacement, using the obtained vertical-displacement correction parameter. As described above, the vertical displacement is corrected in advance prior to the correction to be performed on the disparity error Δd in a subsequent stage. Due to this configuration, the object to be corrected can be limited to the disparity error Δd, which is horizontal displacement. Then, the process shifts to the processes in a step S17.

Step S17

After the correction of vertical displacement, the horizontal-displacement measuring unit 506 of the information processing device 50 measures the horizontal displacement caused due to the optical-axis displacement between a pair of stereo captured images, i.e., the disparity error Δd, using the feature point on the subject 7 detected by the feature-point detection unit 503. More specifically, the horizontal-displacement measuring unit 506 uses the above fifth equation to calculate the disparity error Δd. Then, the process shifts to the processes in a step S18.

Step S18

The correction-parameter calculation unit 507 calculates a horizontal-displacement correction parameter, which is expressed in, for example, the amount of shift on the entire image, based on the disparity error Δd calculated by the horizontal-displacement measuring unit 506. Then, the correction unit 508 corrects the disparity error Δd caused by, for example, the optical-axis displacement, using the obtained horizontal-displacement correction parameter. Then, the process shifts to the processes in a step S19.

Step S19

The correction-parameter calculation unit 507 stores the calculated vertical-displacement correction parameter and horizontal-displacement correction parameter in the storage unit 510 for updates. Subsequently, a stereo captured image that is obtained by the captured-image acquisition unit 500 is corrected using the vertical-displacement correction parameter and horizontal-displacement correction parameter calculated by the correction-parameter calculation unit 507, and a depth map (distance information) is generated. Then, the process returns to the processes in the step S11.

A correction parameter is obtained in the flow of the processes as in the above steps S11 to S19.

Figure 15:
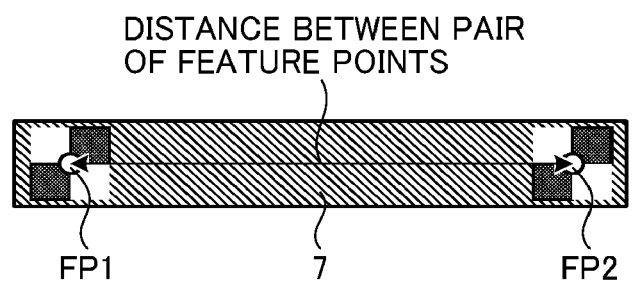
FIG. 15 is a diagram illustrating the distance between a pair of feature points on a subject, according to embodiments of the present disclosure.

FIG. 15 is a diagram illustrating the distance between a pair of feature points on the subject 7, according to the present embodiment.

Figure 16:
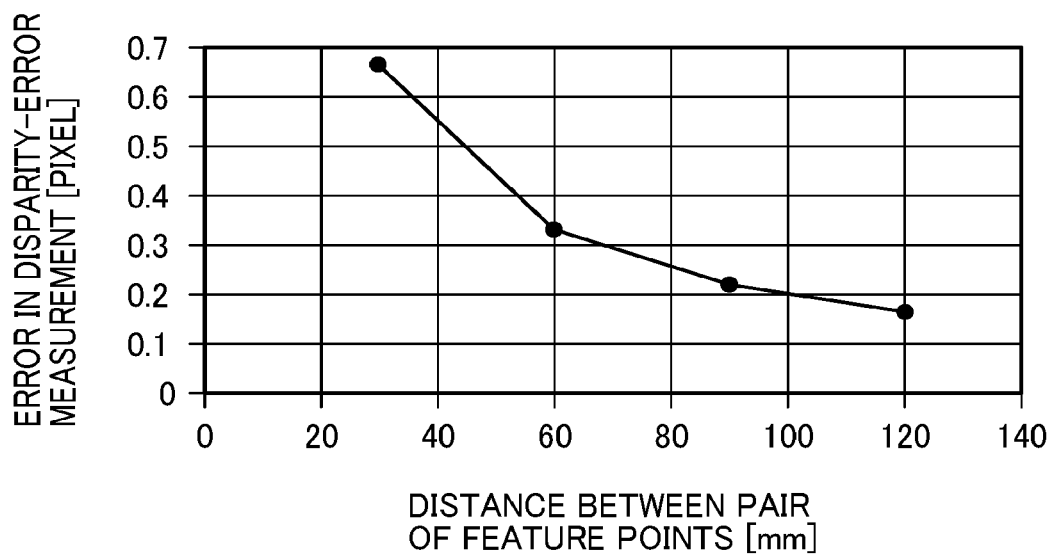
FIG. 16 is a graph illustrating the relation between the distance between a pair of feature points and the error in disparity-error measurement, according to embodiments of the present disclosure.

FIG. 16 is a graph illustrating the relation between the distance between a pair of feature points and the error in disparity-error measurement, according to the present embodiment.

Figure 17:
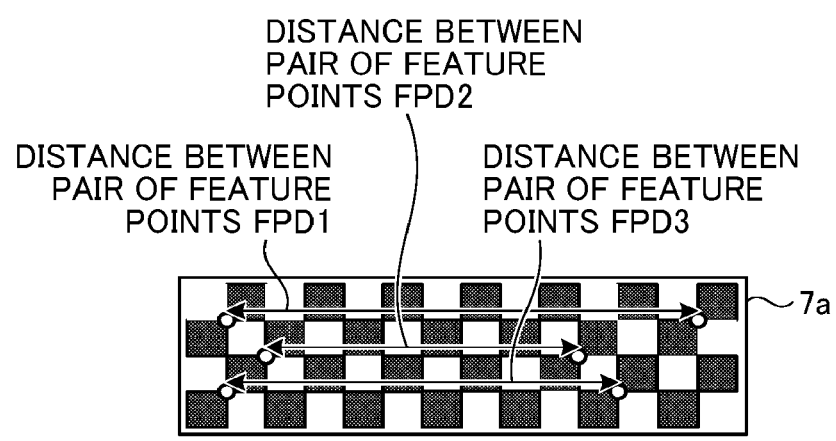
FIG. 17 is a diagram illustrating a case in which the distances between a plurality of feature points on a subject are used, according to embodiments of the present disclosure.

FIG. 17 is a diagram illustrating a case in which the distances between a plurality of feature points on a subject 7a are used, according to the present embodiment.

The error in disparity-error measurement is described below with reference to FIG. 15 to FIG. 17.

As described above, when the displacements in optical axis occur, an error is included in the disparity d as the disparity error Δd. Further, as described above, the distance between the stereo camera 6 and the subject 7 may change. Accordingly, assuming that the disparity after the distance is changed and the distance between a pair of feature points on the image are referred to as d' and $S'_{img}$, respectively, the disparity error Δd is calculated and obtained using the above fifth equation, and can be expressed in a sixth equation given below.

$$\Delta d = \frac{S'_{img}}{S_{img}} d - d' \qquad \text{Sixth Equation}$$

As expressed in the above-described first equation and third equation, the distance $S_{real}$ between the feature points FP1 and FP2 of the subject 7 of FIG. 15 in the real space can be calculated using the distance $S_{img}$ between a pair of feature points on the image. However, a certain level of detection error occurs in the detection of images performed by the imaging devices 601L and 601R, and such a detection error is referred to as a detection error ΔS between a pair of feature points. Assuming that the disparity error that is influenced by such a detection error ΔS between a pair of feature points is Δd', the disparity error can be expressed in a seventh equation given below.

$$\Delta d' = \frac{S'_{img} + \Delta S}{S_{img}} d - d' \qquad \text{Seventh Equation}$$

The distance between a pair of feature points on the image is detected based on the image before the displacements in optical axis occur. Due to such a configuration, when the distance between a pair of feature points on the image is detected after the displacements in optical axis occur, the above detection error ΔS between a pair of feature points occurs. An error $E_d$ caused by the measurement of a disparity error due to the influence of such a detection error ΔS between a pair of feature points (such an error may be referred to as an error $E_d$ in disparity-error measurement in the following description) can be expressed in an eighth equation given below.

$$E_d = \Delta d' - \Delta d = \frac{S'_{img} + \Delta S}{S_{img}} d - d' - \left(\frac{S'_{img}}{S_{img}} d - d'\right) = \frac{\Delta S}{S_{img}} d \qquad \text{Eighth Equation}$$

As described above, the detection error $\Delta S$ between a pair of feature points is constant regardless of the size of the distance between a pair of feature points on the subject 7. Accordingly, if the distance $S_{img}$ between a pair of feature points on the image is expanded using the above eighth equation, the error $E_d$ in the disparity-error measurement can be reduced. In other words, the subject 7 is disposed at a predetermined distance from the from the stereo camera 6, and thus the distance $S_{img}$ between a pair of feature points on the image can be expanded by expanding the distance $S_{real}$ between a pair of feature points in the real space. As described above, if an error $E_d$ in disparity-error measurement is reduced, the accuracy of the calculation of the disparity error $\Delta d$ improves, and the disparity error $\Delta d$ can be corrected with a high degree of precision.

Assuming that the precision required for the disparity-error measurement is $E_{da}$, the distance between a pair of feature points on the subject 7 is set to achieve the distance $S_{img}$ between a pair of feature points on the image that satisfies a ninth equation given below. Accordingly, the precision $E_{da}$ is guaranteed.

$$S_{img} > \frac{\Delta S}{E_{da}} d \qquad \text{Ninth Equation}$$

FIG. 16 is a diagram illustrating the relation between the distance $S_{real}$ [mm] between a pair of feature points in the real space and the error $E_d$ [pixel] in the disparity-error measurement, according to the present embodiment, where the focal length f is 16 [mm], the base-line length B is 150 [mm], the installation position at which the stereo camera 6 is arranged with reference to the road surface 4 is 2100 [mm], and the detection error $\Delta S$ between a pair of feature points is 0.1 [pixel].

As depicted in FIG. 16, it is understood that the error $E_d$ in the disparity-error measurement can be reduced as the distance $S_{real}$ between a pair of feature points in the real space is expanded. In other words, the error $E_d$ in the disparity-error measurement can be reduced as the distance $S_{img}$ between a pair of feature points on the image is expanded. for example, when the rutting depth is measured in order to inspect the road, it is desired that the error $E_d$ in disparity-error measurement satisfies $E_d$<0.1. As the stereo camera 6 is attached to the vehicle 1 that can travel on the road to be measured, the installation position at which the stereo camera 6 is arranged is away from the road surface 4 by about 1800 to 2500 [mm], and it is desired in view of the width of the road to be measured and the measurement accuracy that the stereo camera 6 be used where the focal length f ranged from 10 to 20 [mm] and the base-line length B ranges from 130 to 200 [mm]. For example, if $E_d$<0.1 [pixel] is satisfied when it is assumed that the focal length f is 16 [mm], the base-line length B is 150 [mm], and the installation position at which the stereo camera 6 is arranged is distant from the road surface 4 by 2100 [mm], the error in to-be-measured distance can be reduced to 1 [mm] or shorter. In other words, if the distance $S_{img}$ between a pair of feature points on the image that satisfies the above ninth equation when the precision $E_{da}$=0.1 is adopted, the error in to-be-measured distance can be reduced to 1 [mm] or shorter. As depicted in FIG. 16, the distance between a pair of feature points on the subject 7 need to be equal to or longer than 250 [mm] in order to satisfy $E_d$<0.1 [pixel], where $E_d$ indicates the error in the disparity-error measurement.

Regarding the measurement performance of the rutting depth used for road inspection, the precision within ±3 [mm] is required with reference to a true value. However, in view of the inherent error of the stereo camera 6, it is desired that the precision of the measurement performance of the rutting depth be controlled within ±1 [mm] with reference to a true value.

In the above description of the embodiment of the present disclosure, it is assumed that one distance on the subject 7 between a pair of feature points is used. However, no limitation is intended thereby. For example, as illustrated in FIG. 17, a plurality of distances between a plurality of pairs of feature points (i.e., distances between pairs of feature points FPD1 to FPD3) may be used. Due to such a configuration, the influence of the detection error $\Delta S$ between a pair of feature points, which is random noise, can be reduced.

In order to achieve the distance $S_{img}$ between a pair of feature points on the image that satisfies the above ninth equation, it is not always necessary to use the distance between a pair of feature points on the subject 7 fixed to the attaching component 3. For example, the distance between a pair of feature points detected in the area to be measured MA may be used. However, the relative positions of the stereo camera 6 and the subject 7 is stable. For this reason, it is desired that the distance between a pair of feature points on the subject 7 fixed to the attaching component 3 be used.

As described above, in the imaging system 10 according to the present embodiment, regarding the error $E_d$ that is caused by the measurement of a disparity error due to the influence of such a detection error $\Delta S$ between a pair of feature points, a pair of feature points are used where the distance $S_{img}$ between a pair of feature points on the image satisfies the above ninth equation. Due to such a configuration, the error $E_d$ in the disparity-error measurement can be reduced, and the accuracy of the measurement of the disparity error $\Delta d$ improves. Accordingly, the disparity error $\Delta d$ can be corrected with a high degree of precision. As a pair of feature points where the distance $S_{img}$ between a pair of feature points on the image that satisfies the above ninth equation, for example, a pair of feature points that are detected from the patterns on the subject 7, which is fixed to the attaching component 3 of the vehicle 1, may be used.

In the imaging system 10 according to the present embodiment, a pair of feature points that are detected from the patterns on the subject 7, which is fixed to the attaching component 3 of the vehicle 1, are used in order to correct the positional displacement caused due to, for example, the optical-axis displacement (for example, vertical displacement and a disparity-error). Due to such a configuration, it is not necessary to provide, for example, an adjustment mechanism or adjuster separate from the vehicle 1.

Modification

Figure 18A:
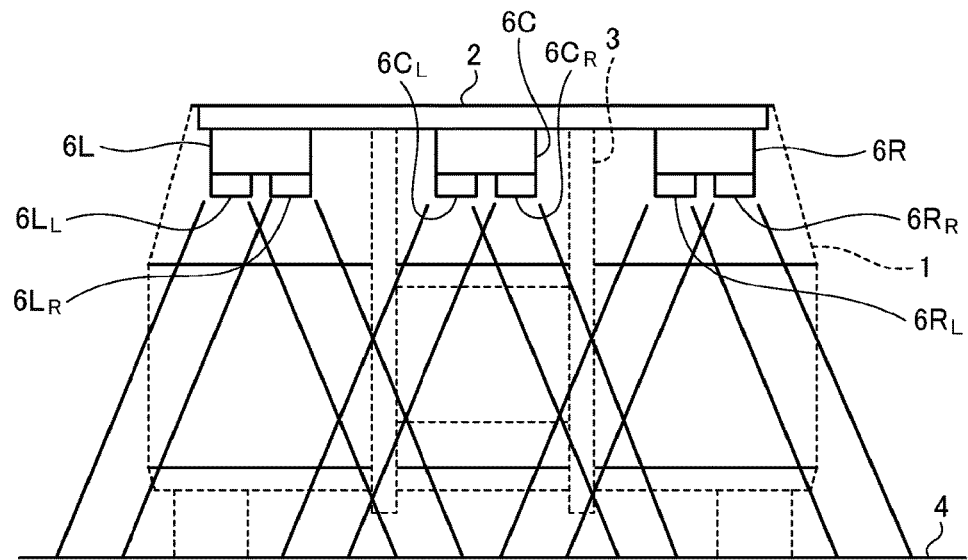
FIG. 18A and FIG. 18B are diagrams each illustrating a configuration of a vehicle for which three pairs of stereo cameras are provided, according to a modification of an embodiment of the present disclosure.
Figure 18B:
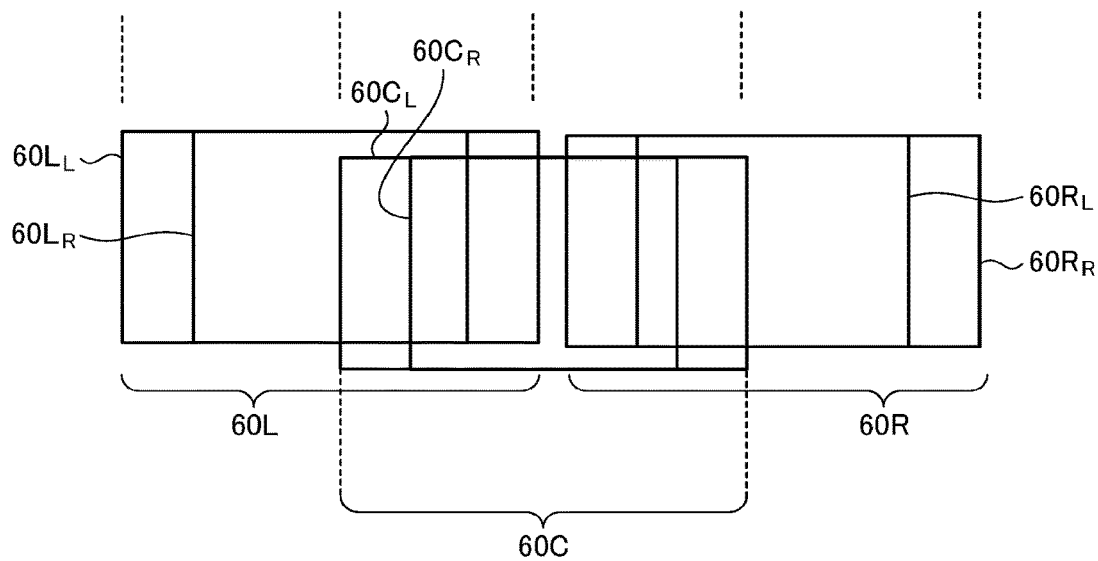

FIG. 18A and FIG. 18B are diagrams each illustrating a configuration of the vehicle 1 for which three stereo cameras 6C, 6L, and 6R are provided, according to a modification of the above embodiments.

The stereo cameras 6C, 6L, and 6R that are provided for the vehicle 1, according to the present modification of the above embodiments, are described below with reference to FIG. 18A and FIG. 18B.

In the embodiments described above, it is assumed that the imaging system 10 performs measurement using the stereo camera 6 provided for the vehicle 1. However, no limitation is intended thereby. For example, as illustrated in FIG. 18A, the imaging system 10 may perform measurement using the three stereo cameras 6C, 6L, and 6R.

In the modification as illustrated in FIG. 18A, the stereo camera 6C is further arranged between the stereo camera 6L and the stereo camera 6R. As illustrated in FIG. 18B, a stereo capturing range 60C consists of the capturing ranges $60C_L$, and $60C_R$ implemented by the imaging lenses $6C_L$, and $6C_R$ of the stereo camera 6C. Moreover, a stereo capturing range 60L consists of the capturing ranges $60L_L$ and $60L_R$ implemented by the imaging lenses $6L_L$ and $6L_R$ of the stereo camera 6L, and a stereo capturing range 60R consists of the capturing ranges $60R_L$, and $60R_R$ implemented by the imaging lenses $6R_L$, and $6R_R$ of the stereo camera 6R. The stereo cameras 6L, 6C, and 6R are arranged such that the multiple stereo capturing ranges 60L, 60C, and 60R of the respective stereo cameras will overlap with each other in the width direction of the vehicle 1 in a predetermined overlapping ratio.

As described above, three stereo cameras 6L, 6C, and 6R are used in order to capture a single traffic lane in the present modification of the above embodiments in the present modification of the above embodiment. Due to such a configuration, a capturing range can be arranged in the center of the lane and on the right and left sides of the lane, respectively, to capture images, and high-quality (high-resolution) stereo captured images can be obtained by a small number of stereo cameras. As known in the art, in particular, the road width is set to 3.5 meters (m) in the present modification of the above embodiment. In order to handle such a situation where the road width is set to 3.5 (m), for example, both sides of the lane in the road-width directions are captured by the stereo cameras 6L and 6R, and the center of the lane is captured by the stereo camera 6C.

Each of the functions of the embodiments of the present disclosure and their modification may be implemented by one or more processing circuits or circuitry. Processing circuitry includes a processor programmed to execute software like a processor implemented by an electronic circuit. A processing circuit also includes devices such as an application specific integrated circuit (ASIC), digital signal processor (DSP), field programmable gate array (FPGA), a system on a chip (SoC), a graphics processing unit (GPU), and conventional circuit modules designed to perform the recited functions.

In the embodiments of the present disclosure and their modification, when at least some of the multiple functional units of the information processing device 50 is implemented by executing a program, such a program may be incorporated in advance in a read only memory (ROM) or the like. The program to be executed by the information processing device 50 according to the embodiments of the present disclosure and their modification may be installed for distribution in any desired computer-readable recording medium such as a compact disc, a read-only memory (CD-ROM), a flexible disk (FD), a compact disc-recordable (CD-R), and a digital versatile disk (DVD) in a file format installable or executable by a computer. The program that is executed in the information processing device 50 according to the above embodiments of the present disclosure and their modification may be provided upon being stored in a computer connected to a network such as the Internet and downloaded through the network. A program to be executed by the information processing device 50 according to the above embodiments of the present disclosure and their modification may be provided or distributed through a network such as the Internet. A program to be executed by the information processing device 50 according to the above embodiments of the present disclosure and their modification has module structure including at least one of the above-described functional units. Regarding the actual hardware related to the program, the CPU 5000 reads and executes the program from the memory as described above (e.g., the ROM 5001) to load the program onto the main memory (e.g., the RAM 5002) to implement the above multiple functional units.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A measuring device comprising circuitry to:
obtain at least one pair of stereo captured images captured by a stereo camera, the stereo camera including a pair of imaging devices;
detect two or more feature points from each one of the at least one pair of stereo captured images; and
measure a disparity error using a distance between a pair of feature points of the two or more feature points on each one of the at least one pair of stereo captured images,
wherein an equation $$S_{img} > \frac{\Delta S}{E_{da}} d$$

is satisfied,
where
$S_{img}$ denotes the distance,
$\Delta S$ denotes a detection error between the pair of imaging devices,
$E_{da}$ denotes precision of measurement of a disparity error in disparity between a pair of images of the at least one pair of stereo captured images, and
d denotes the disparity.

2. The measuring device according to claim 1,
wherein the circuitry detects at least two feature points from a part corresponding to a subject appearing on one of the at least one pair of stereo captured images, the subject being fixed to a position included in a capturing range of the stereo camera between the stereo camera and an object to be measured, and
wherein the circuitry measures the disparity error using another distance between the at least two feature points on the part corresponding to the subject as the distance.

3. The measuring device according to claim 2,
wherein the subject has a checker pattern, and
wherein the circuitry detects a grid pattern in the checker pattern as a feature point, from the part corresponding to the subject.

4. The measuring device according to claim 2,
wherein the distance includes a plurality of distances as determined by the at least two feature points on the part corresponding to the subject, and wherein the circuitry measures the disparity error based on the plurality of distances.

5. The measuring device according to claim 1,
wherein the circuitry calculates a first correction parameter used to correct the disparity error, based on the disparity error, and
wherein the circuitry corrects the disparity error using the first correction parameter.

6. The measuring device according to claim 5,
wherein the circuitry measures an amount of vertical displacement, based on the two or more feature points detected from one of the at least one pair of stereo captured images, the amount of vertical displacement being a positional displacement in a direction orthogonal to a direction of the disparity,
wherein the circuitry calculates a second correction parameter used to correct the vertical displacement, based on the amount of vertical displacement, and
wherein the circuitry corrects the vertical displacement using the second correction parameter.

7. The measuring device according to claim 6,
wherein the circuitry detects a feature point at least from an area to be measured on one of the at least one pair of stereo captured images, and
wherein the circuitry measures the amount of vertical displacement based on, at least, the feature point detected from the area to be measured.

8. The measuring device according to claim 6, wherein, after the vertical displacement on one of the at least one pair of stereo captured images is corrected using the second correction parameter, the circuitry measures the disparity error.

9. The measuring device according to claim 1, wherein the circuitry measures the disparity error based on the distance that satisfies the equation when the precision is 0.1 pixel.

10. The measuring device according to claim 1,
wherein the circuitry detects an optical-axis displacement of the stereo camera, and
wherein, when the displacement caused in optical axis is detected by the circuitry, the circuitry measures the disparity error based on the distance determined by the two or more feature points detected by the circuitry.

11. The measuring device according to claim 10, wherein the circuitry detects the optical-axis displacement based on detection information from a sensor that detects, at least, temperature or acceleration.

12. The measuring device according to claim 1,
wherein the circuitry generates distance information based on the at least one pair of stereo captured images, and
wherein the circuitry generates the distance information based on the at least one pair of stereo captured images captured by the stereo camera while the measuring device is moving.

13. The measuring device according to claim 1, wherein, when speed of the measuring device is equal to or slower than prescribed speed, the circuitry measures the disparity error based on the distance determined by the two or more feature points.

14. A measuring system comprising:
a stereo camera including a pair of imaging devices; and
a measurement device including circuitry to
obtain at least one pair of stereo captured images captured by a stereo camera,
detect two or more feature points from each one of the at least one pair of stereo captured images, and
measure a disparity error using a distance between a pair of feature points of the two or more feature points on each one of the at least one pair of stereo captured images,
wherein an equation $$S_{img} > \frac{\Delta S}{E_{da}} d$$

is satisfied,
where
$S_{img}$ denotes the distance,
$\Delta S$ denotes a detection error between the pair of imaging devices,
$E_{da}$ denotes precision of measurement of a disparity error in disparity between a pair of images of the at least one pair of stereo captured images, and
d denotes the disparity.

* * * * *